(12) United States Patent
Slattery et al.

(10) Patent No.: US 12,325,435 B2
(45) Date of Patent: Jun. 10, 2025

(54) CONTROL ACTIVATION OF AN AUTONOMOUS NAVIGATION FUNCTION OF A VEHICLE

(71) Applicant: Rivian IP Holdings, LLC, Plymouth, MI (US)

(72) Inventors: Michael Slattery, Irvine, CA (US); Oliver Jeromin, Bloomfield, CA (US); Sebastiaan Bongers, Zurich (CH)

(73) Assignee: Rivian IP Holdings, LLC, Irvine, CA (US)

( * ) Notice: Subject to any disclaimer, the term of this patent is extended or adjusted under 35 U.S.C. 154(b) by 374 days.

(21) Appl. No.: 17/898,772

(22) Filed: Aug. 30, 2022

(65) Prior Publication Data

US 2024/0067194 A1    Feb. 29, 2024

(51) Int. Cl.
| | |
|---|---|
| *B60W 50/06* | (2006.01) |
| *B60W 30/06* | (2006.01) |
| *B60W 50/10* | (2012.01) |
| *B60W 50/14* | (2020.01) |
| *B60W 60/00* | (2020.01) |
| *G06Q 40/08* | (2012.01) |

(52) U.S. Cl.
CPC ............ *B60W 50/06* (2013.01); *B60W 30/06* (2013.01); *B60W 50/10* (2013.01); *B60W 50/14* (2013.01); *B60W 60/001* (2020.02); *B60W 60/0051* (2020.02); *B60W 60/0053* (2020.02); *G06Q 40/08* (2013.01); *B60W 2050/146* (2013.01); *B60W 2556/10* (2020.02)

(58) Field of Classification Search
CPC ............ B60W 50/06; B60W 60/0053; B60W 60/0051
See application file for complete search history.

(56) References Cited

U.S. PATENT DOCUMENTS

| | | | |
|---|---|---|---|
| 10,293,816 B2 | 5/2019 | Elwart et al. | |
| 10,635,844 B1* | 4/2020 | Roose | G06F 30/20 |
| 11,024,160 B2 | 6/2021 | Ricci | |
| 11,282,143 B1 | 3/2022 | Konrardy et al. | |
| 11,377,115 B2* | 7/2022 | Pretsch | G06F 30/20 |
| 11,436,484 B2* | 9/2022 | Farabet | G06V 10/454 |
| 12,182,694 B2* | 12/2024 | Farabet | G06V 10/82 |
| 2017/0132334 A1* | 5/2017 | Levinson | B60W 50/00 |
| 2018/0060701 A1* | 3/2018 | Krishnamurthy | G06N 3/045 |

(Continued)

*Primary Examiner* — Ramsey Refai
(74) *Attorney, Agent, or Firm* — Foley & Lardner LLP

(57) ABSTRACT

Controlling activation of an autonomous navigation function of a vehicle is provided. A system can include a data processing system with one or more processors, coupled to memory. The data processing system can determine, based on data collected from a vehicle and using a machine learning model trained on historical driving data associated with a driver of the vehicle and a driver having a driver profile corresponding to the historical driving data, that a vehicle controller of the vehicle is configured to autonomously navigate the vehicle through a scenario, facilitate, based on the collected data and the trained model, display of a prompt at the vehicle to activate autonomous navigation of the vehicle for the scenario, and upon receiving an indication of activation from the driver, provide instructions to the vehicle controller to perform autonomous driving control through the scenario, thereby reducing likelihood of error and lowering insurance premiums.

20 Claims, 15 Drawing Sheets

(56) References Cited

U.S. PATENT DOCUMENTS

| | | | |
|---|---|---|---|
| 2018/0247160 A1* | 8/2018 | Rohani | G05D 1/0221 |
| 2019/0113917 A1* | 4/2019 | Buch | G06N 3/00 |
| 2019/0179979 A1* | 6/2019 | Melick | G06F 30/15 |
| 2019/0303759 A1* | 10/2019 | Farabet | G05D 1/00 |
| 2019/0382007 A1* | 12/2019 | Casas | B60W 30/0956 |
| 2020/0110416 A1* | 4/2020 | Hong | G05D 1/0088 |
| 2020/0231177 A1* | 7/2020 | Ferzli | G06F 16/957 |
| 2020/0249685 A1* | 8/2020 | Elluswamy | G06T 7/20 |

\* cited by examiner

CONTROL ACTIVATION OF AN AUTONOMOUS NAVIGATION FUNCTION OF A VEHICLE

INTRODUCTION

A driver can manually operate or drive a vehicle in various environments. The environments can include obstructions that can impede the vehicles path.

SUMMARY

This technical solution described herein is generally directed to improving the activation of advanced driver assistance system (ADAS) functions of a vehicle to reduce manual or erroneous operation of the vehicle. For example, this technical solution can include a model that can seamlessly reflect a reduction of risk in an insurance price or rate. The technical solution can improve the detection of environments where certain ADAS functions (e.g., autonomous driving) of a vehicle can be best utilized, and also leverage machine learning to track utilization and performance of the ADAS functions over time for determining an optimum timing to activate a particular ADAS function. For example, the technical solution can use the model to determine whether to activate ADAS functions such as an automated driving maneuver (e.g., lane assist on a road or highway) or automated forward or reverse parking maneuver. The technical solution can modify operations associated with a vehicle based on operating states of the vehicle at a high level of granularity. For example, systems and methods of this technical solution can detect, monitor, and track over time various metrics associated with state of a vehicle or one or more components thereof, to provide a detailed set of data. The granularity of the data set can advantageously allow deployment of improved models, using machine learning, to operate the vehicle and monitor operation of the vehicle, for example. The improved model can provide technical improvements including operation of a vehicle or monitoring of various aspects of vehicle performance within boundaries at higher granularity or lower tolerances. For example, the model can improve the operation of the vehicle and the insurance risk and therefore the price of the insurance policy. Operating a vehicle in accordance with the technical improvements discussed herein can improve performance of discrete vehicle systems, including systems associated with autonomous movement of a vehicle and systems monitoring the autonomous movement of the vehicle. For example, the vehicle controller can reduce the risk associated with the maneuver by reducing or eliminating errors in manual driving. This change in risk can be measured, and insurance pricing can be dynamically altered to reflect the lowered risk. Thus, for example, the more frequently an autonomous navigation is used, the more an insurance rate corresponding to a vehicle can be lowered.

In some aspects, a system can include a data processing system. The data processing system can include one or more processors, coupled to memory. The data processing system can determine, based on data collected from a sensor of a vehicle that identifies an environment and using a machine learning model trained on historical driving data associated with a driver of the vehicle and a driver having a driver profile corresponding to the historical driving data, that a vehicle controller of the vehicle is configured to autonomously navigate the vehicle through a predetermined maneuver in the environment identified by the sensor. The data processing system can facilitate, based on the collected data and the trained model, display of a prompt at the vehicle to activate autonomous navigation of the vehicle for the predetermined maneuver. The data processing system can, upon receiving an indication of activation from the driver, provide instructions to the vehicle controller to perform autonomous driving control through the predetermined maneuver.

In some aspects, a vehicle can include a sensor, a user interface, a non-transitory memory, and one or more processors. The processors can collect, via the sensor, data associated with a driver of the vehicle and that identifies an environment. The processors can display, via the user interface and based on the collected data and a model trained using machine learning on historical driving data associated with the driver of the vehicle and a driver having a driver profile corresponding to the historical driving data, a prompt at the user interface to activate autonomous navigation of the vehicle for a predetermined maneuver in the environment identified by the sensor. The processors can transmit, via the user interface and in response to a determination based on the data collected from the vehicle that a vehicle controller of the vehicle is configured to autonomously navigate the vehicle through the predetermined maneuver, an indication of activation from the driver of the vehicle. The processors can provide, in response to the indication of activation from the driver, instructions to the vehicle controller to perform autonomous driving control through the predetermined maneuver.

In some aspects, a system can perform a method. The method can include determining, based on data collected from a sensor of a vehicle that identifies an environment and using a machine learning model trained on historical driving data associated with a driver of the vehicle and a driver having a driver profile corresponding to the historical driving data, that a vehicle controller of the vehicle is configured to autonomously navigate the vehicle through a predetermined maneuver corresponding to the environment identified by the sensor. The data processing system can facilitate, based on the collected data and the trained model, display of a prompt at the vehicle to activate autonomous navigation of the vehicle for the predetermined maneuver. The data processing system can, upon receiving an indication of activation from the driver, provide instructions to the vehicle controller to perform autonomous driving control through the predetermined maneuver.

At least one aspect of this technical solution can be directed to a system. The system can include a data processing system having one or more processors, coupled to memory. The data processing system can determine a plurality of instances of a scenario in which a model, trained with machine learning, indicates that a vehicle controller of the vehicle is configured to autonomously navigate the vehicle through the scenario. The data processing system can determine the vehicle controller is configured to autonomously navigate the vehicle through the scenario based on data collected from the vehicle. The data processing system can determine a frequency of activation of the vehicle controller to autonomously navigate the vehicle in the plurality of instances of the scenario. The data processing system can receive an indication of performance of the vehicle during the plurality of instances of the scenario. The data processing system can update, based on the performance of the vehicle and the frequency of activation, the model. The data processing system can provide, based on the model updated with the performance and the frequency of activation, a prompt to activate the vehicle controller in a subsequent instance of the scenario.

At least one aspect of this technical solution can be directed to a vehicle. The vehicle can include at least one of a sensor, a user interface, a non-transitory memory, or one or more processors. The one or more processors can detect, by the sensor, a subsequent instance of a scenario in which a model, trained with machine learning with input including a plurality of instances of the scenario, indicates that a vehicle controller of the vehicle is configured to autonomously navigate the vehicle through the scenario. The one or more processors can present a prompt via the user interface to activate the vehicle controller in the subsequent instance of the scenario. The one or more processors can present the prompt based on a model updated with a performance of the vehicle during a plurality of instances of the scenario and a frequency of activation of the vehicle controller in the plurality of instances to autonomously navigate the vehicle.

At least one aspect of this technical solution can be directed to a method. The method can be performed by a data processing system having one or more processors, coupled to memory. The method can include the data processing system determining, based on data collected from a sensor of a vehicle that identifies an environment, a plurality of instances of a scenario in which a model, trained with machine learning, indicates that a vehicle controller of the vehicle is configured to autonomously navigate the vehicle through the scenario. The method can include the data processing system determining a frequency of activation of the vehicle controller in the plurality of instances of the scenario to autonomously navigate the vehicle. The method can include the data processing system receiving an indication of performance of the vehicle during the plurality of instances of the scenario. The method can update, based on the performance of the vehicle and the frequency of activation, the model. The method can cause, based on the model updated with the performance and the frequency of activation, a user interface of a vehicle to present a prompt to activate the vehicle controller in a subsequent instance of the scenario. The method can facilitate, based on the performance of the vehicle, the frequency of activation, and a frequency of utilization of an insurance resource associated with the vehicle and the vehicle controller, modification of an insurance account associated with the driver.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
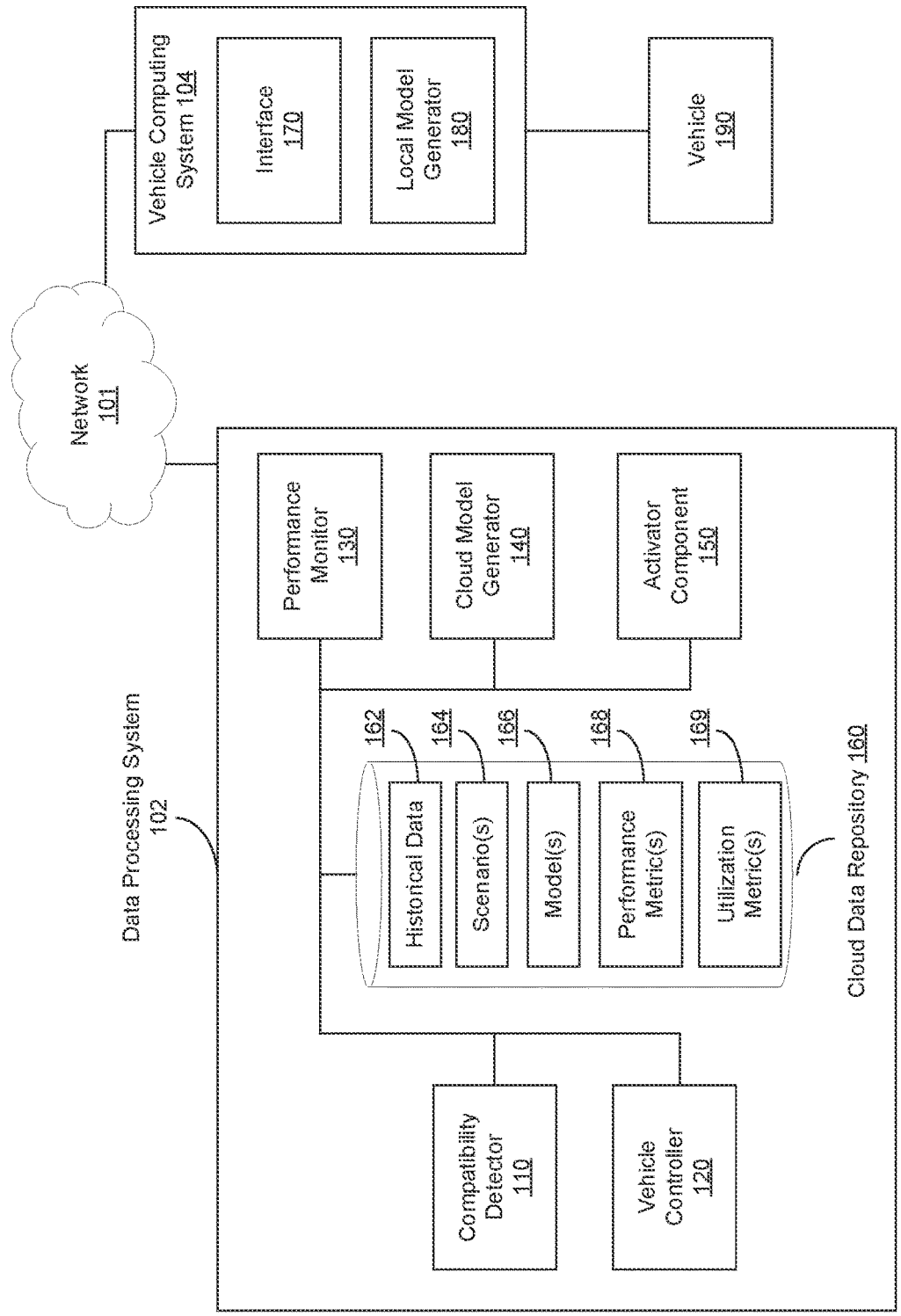
FIG. 1 depicts a block diagram of an example system to control activation of an autonomous navigation function of a vehicle.

Following below are more detailed descriptions of various concepts related to, and implementations of, methods, apparatuses, and systems of that control activation of an autonomous navigation function of a vehicle. The various concepts introduced above and discussed in greater detail below may be implemented in any of numerous ways.

The disclosed solutions have a technical advantage of operation of a vehicle or monitoring of various aspects of vehicle performance within boundaries at higher granularity or lower tolerances. Operating a vehicle in accordance with the technical advantage discussed herein can have a technical advantage of improving performance of discrete vehicle systems, including systems associated with autonomous movement of a vehicle and systems monitoring the autonomous movement of the vehicle. For example, this technical solution can provide technical advantages of improving systems beyond vehicle systems applicable to risk-based models used to define insurance pricing. For example, monitoring how each driver utilizes the ADAS tools at their disposal, learning how and when to offer semi-autonomous support, can result in modified risk profiles that generate truly personalized (and controllable) insurance rates.

For example, a data processing system of this technical solution can improve the activation of ADAS functions of a vehicle to reduce manual or erroneous operation of the vehicle. The data processing system can track utilization and performance of the ADAS functions over time to generate a model using machine learning, and use the model to determine when to activate an ADAS function of a vehicle, such as an automated driving maneuver. For example, this technical solution can provide the technical improvement of increased accuracy of an autonomous driving mode, by the technical solution of a machine learning model that can identify performance of the autonomous driving mode with respect to particular scenarios. For example, the model can train both the autonomous driving systems, and when and how to engage users to reduce the combined risk and handoff between manual driving and an autonomous parking mode that takes over and reduces the risk of pulling in and out of tight spots.

The machine learning model can obtain input from various sources and various sensors to identify a scenario. For example, the machine learning model can identify a scenario based on a state of an environment surrounding the vehicle. One or more cameras of the vehicle can detect one or more physical features external to the vehicle, and can determine an environment. From the environment, the machine learning model can determine whether the environment is linked to any autonomous driving modes of the vehicle. For example, the machine learning model can determine based on concrete pillars and a flat ground surface that a vehicle is in a parking garage and that the vehicle includes an autonomous parking mode for parallel parking or perpendicular parking in an urban parking structure or parking lot.

For example, machine learning model can identify a scenario based on a state of the vehicle in a particular environment. The machine learning model can identify a suspension mode, a tilt of the vehicle in one or more of pitch, yaw, and roll, or any combination thereof. For example, the machine learning model can obtain vehicle telemetry from a particular vehicle including a state of a suspension of the vehicle and a state of one or more of pitch, yaw and roll of the vehicle. The machine learning model can determine, based on a suspension in a high-resistance or "off road" state, and a pitch indicating an off-road terrain, that the vehicle is in an off-road environment. The machine learning model can also obtain input from a camera of the vehicle to identify rocky or muddy terrain, and identify an off-road terrain based on the input from the camera. The vehicle can identify a scenario for off-road parking that can orient the vehicle to minimize tipping or sliding on unstable terrain, for example.

The vehicle can include a user interface to receive input from a user of the vehicle to further increase the granularity of the data set and further advantageously increase the technical improvements of monitoring and operations as discussed herein. The user interface of the vehicle can advantageously provide a direct and individualized communication protocol between an individual vehicle and one or more monitoring and operation system coupled or integrated therewith. Thus, a technical solution for intelligent maneuver assistance is provided.

The system can include a vehicle communicatively coupleable with a remote server. The remote server can be communicatively coupled with or include one or more systems to monitor various aspects of the vehicle and modify various operations associated with the vehicle. The system can receive individualized feedback from a user at a vehicle, and generate individualized modification to various accounts associated with the vehicle at a higher level of granularity and based on user input provided from the vehicle and sensor input provided from the vehicle. The system can modify an insurance rate associated with a particular vehicle, based on a frequency of usage of an autonomous movement mode in an environment associated with the autonomous movement mode. The autonomous movement mode can include a self-parking feature, and the environment (or scenario) can include a parking lot or parking structure with an empty parking space. The vehicle or the remote server, for example, can determine whether the vehicle is near the empty parking space, and whether the vehicle can maneuver into the parking space (e.g., parallel or perpendicular parking between two vehicles based on size of the space and accounting for door opening of the driver and/or passenger(s), unloading of items from the truck bed, etc). The vehicle or the remote server, for example, can determine that a low speed autonomous driving assistance feature may be desired in an off-road scene where there are limited traffic signs or stop lights but where other vehicles associated with manufacturer have traversed using the autonomous driving features (e.g., driving in a crowded forest, rock crawling, shallow stream, etc.). For example, the vehicle can include one or more processing units configured to provide instructions for producing a user interface affordance to receive input and presentations to provide output to a user of the vehicle having an autonomous driving feature (e.g., self-parking). Here, the user interface can provide an affordance to inform the user that a self-parking feature is available and can be activated, and can provide a presentation to encourage the user to activate the self-parking feature. Once activated, the vehicle can maneuver into the parking space. The user interface can provide presentations indicating various advantages of using the automated driving assistance feature or accrued advantages from past use, such as cost savings to an insurance premium.

This technology can provide to a vehicle or generate at the vehicle a modification of an operation associated with the vehicle, based at least in part on previous operation of the vehicle or modes of operation of the vehicle. Modification to an operation associated with the vehicle can include modification of an account, for example, dependent on one or more aspects of operation of the vehicle, including on use or frequency of use, for example, of various modes of operation of the vehicle. The vehicle or remote server can determine a modification based on a model trained using machine learning with past usage of a mode of operation across one or more vehicles. A model can determine an adjustment, discount, or the like applicable to an insurance account associated with the vehicle and managed by the vehicle manufacturer, based on frequency of use of a mode including a self-parking feature. Thus, for example, an operation to reduce an insurance premium can be executed with respect to a vehicle that activates a self-parking feature with a frequency that satisfies a particular predetermined threshold. For example, present implementations can manage cloud-based profiles of users or drivers and can store driving behavior. Present implementations can manage insurance accounts and can adjust these accounts based on past autonomous driving performance in particular driving scenarios and vehicle data collected in connection with one or more individualized drivers or vehicles. The model can advantageously receive input from the vehicle regarding the frequency of use of the self-parking feature on a periodic or continuous basis. In response, the model can advantageously generate a modification to the account or other operation that is rapidly responsive to activation of a mode of the vehicle. For example, use of ADAS features can be activated according to a frequency that can correspond to a measured increase or decrease of overall risk.

In some aspects, the data processing system can determine, based on the collected data, a plurality of instances of the scenario in which the model indicates that the vehicle controller is capable of performing the autonomous driving control through the scenario. The data processing system can determine a frequency of activation of the vehicle controller to perform the autonomous driving control in the plurality of instances of the scenario. The data processing system can update, based on a performance of the autonomous driving control and the frequency of activation, the model.

In some aspects, the data processing system can receive, in response to a first selection via a user interface of the vehicle, an indication of deactivation of the vehicle controller during the subsequent instance of the scenario. The data processing system can update, based on the performance of the vehicle, the frequency of activation, and the indication of deactivation, the model. The data processing system can receive, in response to a second selection via the user interface, an indication of the activation of the vehicle controller in the subsequent instance of the scenario.

In some aspects, the scenario can correspond to an environment proximate to the vehicle and corresponding to the scenario to perform the autonomous driving control by the vehicle controller. In some aspects, the scenario can correspond to a parking space proximate to the vehicle, and the vehicle controller operable to maneuver the vehicle proximate to the parking space. In some aspects, the data processing system can generate, based on the performance of the vehicle, the frequency of activation, and a frequency of utilization of a first resource associated with the vehicle and the vehicle controller, the model. In some aspects, the data processing system can facilitate, based on the performance of the vehicle, the frequency of activation, and a frequency of utilization of an insurance resource associated with the vehicle and the vehicle controller, modification of an insurance account associated with the driver and managed by an entity that manufacturers the vehicle.

In some aspects, the vehicle can include the model to indicate a plurality of instances of the scenario based on the collected data that the vehicle controller is capable of performing the autonomous driving control through the scenario. The vehicle can perform, based on a frequency of activation of the vehicle controller, the autonomous driving control in the plurality of instances of the scenario, the model to update based on a performance of the autonomous driving control and the frequency of activation.

In some aspects, the vehicle can include the one or more processors to receive, via the user interface, a first selection corresponding to an indication of deactivation of the vehicle controller during the subsequent instance of the scenario. The vehicle can transmit, in response to receipt of the first selection via the user interface, the indication of deactivation. The vehicle can cause, in response to the transmission and based on the performance of the vehicle, the frequency of activation, and the indication of deactivation, the model to be updated. The vehicle can receive, via the user interface, a second selection responsive to the prompt. The vehicle can transmit, in response to receipt of the second selection, an indication of activation of the vehicle controller in the subsequent instance of the scenario.

In some aspects, the data processing system can determine, based on the collected data, a plurality of instances of the scenario in which the model indicates that the vehicle controller is capable of performing the autonomous driving control through the scenario. The data processing system can determine a frequency of activation of the vehicle controller to perform the autonomous driving control in the plurality of instances of the scenario. The data processing system can update, based on a performance of the autonomous driving control and the frequency of activation, the model.

In some aspects, the data processing system to receive, in response to a first selection via the user interface of the vehicle, an indication of deactivation of the vehicle controller during the subsequent instance of the scenario. The data processing system can update, based on the performance of the vehicle, the frequency of activation, and the indication of deactivation, the model. The data processing system can receive, in response to a second selection via the user interface, an indication of activation of the vehicle controller in the subsequent instance of the scenario.

FIG. 1 depicts a block diagram of an example system to control activation of an autonomous navigation function of a vehicle. As illustrated by way of example in FIG. 1, an example system 100 can include, access, interface with, or otherwise utilize one or more of a network 101, a data processing system 102, or a vehicle computing system 104.

The network 101 can be any type and/or form of network. The geographical scope of the network 101 can vary widely and the network 101 can be a body area network (BAN), a personal area network (PAN), a local-area network (LAN), e.g. Intranet, a metropolitan area network (MAN), a wide area network (WAN), or the Internet. The topology of the network 101 can be of any form and can include, e.g., any of the following: point-to-point, bus, star, ring, mesh, or tree. The network 101 can be an overlay network which is virtual and sits on top of one or more layers of other networks 101. The network 101 can be of any such network topology as known to those ordinarily skilled in the art capable of supporting the operations described herein. The network 101 can utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite can include application layer, transport layer, internet layer (including, e.g., IPv6), or the link layer. The network 101 can be a type of a broadcast network, a telecommunications network, a data communication network, or a computer network.

The data processing system 102 can include at least one compatibility detector 110 to determine whether a vehicle controller of the vehicle can autonomously navigate the vehicle in a certain scenario. The data processing system 102 can include at least one vehicle controller 120 to provide one or more instructions to operate the vehicle 190 in an autonomous mode. The data processing system 102 can include at least one performance monitor 130 to determine characteristics associated with operation of the vehicle under manual control of a driver, under autonomous control of an ADAS feature or the like, or any combination thereof. The data processing system 102 can include at least one cloud model generator 140 to generate and update one or more models generated using machine learning. The data processing system 102 can include at least one activator component 150 to provide one or more instructions to operate the interface 170. The data processing system can include at least one cloud data repository 160 to store one or more types and collections of data associated with the vehicle 190.

The compatibility detector 110 can determine whether a vehicle controller of a vehicle is configured to autonomously navigate a vehicle with respect to a particular environment or scenario associated with an environment. The compatibility detector 110 can obtain input corresponding to one or more aspects of a physical environment surrounding or proximate to the vehicle. For example, the compatibility detector 110 can detect by one or more sensors of the vehicle or associated therewith, one or more aspects of an indoor or outdoor physical environment. An indoor environment can include a parking garage or parking structure. An outdoor environment can include a parking lot, parallel parking lane or space. The indoor or outdoor environment can correspond to any built environment or natural environment. The compatibility detector 110 can identify one or more characteristics associated with an indoor or outdoor physical environment, and can determine whether the environment corresponds to an environment associated with a vehicle controller of the vehicle.

The compatibility detector 110 can determine that the vehicle is proximate to or within a parking structure, and can determine that the vehicle controller includes a self-parking mode operable to autonomously maneuver the vehicle within the parking structure. The compatibility detector 110 can determine that the vehicle is proximate to or within a parking structure based on a determination that a geolocation associated with the vehicle 190 is proximate to a geolocation or within a geofence associated with a parking structure, parking lane, parking space, or the like, or any combination thereof. A vehicle 190 may be proximate to a particular object or location where the object or location is detectable by one or more sensors of the vehicle 190. A vehicle 190 may be proximate to a particular object or location where the object tor location partially or completely surrounds the vehicle 190. A vehicle 190 may be proximate to a particular object or location where a distance from the vehicle 190 to the object or location is less than a dimension or a multiple of the dimension of the vehicle 190.

The compatibility detector 110 can obtain the geolocation or geofence associated with the parking structure, parking lane, parking space, or the like, or any combination thereof, based on a predetermined geolocation or geofence assigned thereto. The compatibility detector 110 can obtain the geolocation or geofence associated with the parking structure, parking lane, parking space, or the like, or any combination thereof, based on a geolocation or geofence associated with a location in which a manual parking or self-parking maneuver was successfully completed by the vehicle or another vehicle. A data processing system 102 or 202 associated with the vehicle can query a data repository storing geolocations of known areas where the self-parking ADAS feature has previously been successfully completed. The compatibility detector 110 can determine that the vehicle is proximate to or within a parking structure based detection of one or more physical objects or structures proximate to the vehicle, and a determination that the one or more physical objects or structure proximate to the vehicle correspond to a parking structure, parking lane, parking space, or the like, or any combination thereof. A data processing system 102 or 202 associated with the vehicle can perform one or more of image recognition and pattern recognition to determine that a parking structure, parking lane, parking space, or the like, or any combination thereof has characteristics that satisfy constraints of self-parking mode. Characteristics can include, for example, the size of the parking spot, an amount of physical space between adjacent cars and the parking spot, and one or more types associated with vehicles in adjacent spots. A vehicle type can be associated with or correspond to a designation of a known vehicle type or an unknown vehicle type.

The vehicle controller 120 can provide one or more instructions to operate the vehicle 190 in an autonomous mode. The vehicle controller 120 can provide one or more instructions to define, calibrate, control, or supervise, for example, operation of the vehicle 190 in one or more autonomous modes. For example, the vehicle controller 120 can instruct the vehicle computing system 104 to operate the vehicle controller in accordance with a self-parking feature of an advanced driving assistance (ADAS) system. The vehicle controller 120 can set or modify one or more parameters associated with the vehicle computing system 104, to ensure operation of the vehicle 190 within one or more restrictions or targets for movement or maneuvering of the vehicle 190 in accordance one or more ADAS features. The vehicle 190 can correspond at least partially in structure and operation to the vehicle of FIG. 10 as discussed herein.

The performance monitor 130 can determine one or more characteristics associated with operation of the vehicle 190. The performance monitor 130 can determine characteristics associated with operation of the vehicle under manual control of a driver, under autonomous control of an ADAS feature or the like, or any combination thereof. Characteristics associated with operation of the vehicle 190 can include but are not limited to detected instances of availability of an ADAS feature, use of an ADAS feature, or deactivation of an activated ADAS features. Characteristics can be associated with particular environments, to advantageously monitor performance of the vehicle 190 with granularity specific to particular environments or scenarios. For example, the performance monitor 130 can differentiate between performance of a vehicle with respect to ADAS feature use and manual use separately for a parking garage, a parallel parking location, and a parking lot outdoors.

The cloud model generator 140 can generate and update one or more models generated using machine learning. The cloud model generator 140 can generate or update a model based on input received at least from one or more repositories of the cloud data repository 160, the performance monitor 130, the vehicle controller 120, and the compatibility detector 110. The cloud model generator 140 can generate one or more models identifying performance over time of one or more utilization metrics associated with the vehicle 190, and can generate the utilization metrics based on one or more of the performance metrics associated with the vehicle 190. The cloud model generator 140 can generate models 166 for more than one vehicle 190, or can generate a model that is application or can be used by more than one vehicle 190. The cloud model generator 140 can generate and update one or more models 166 associated with one or more vehicles based on performance metrics associated with particular vehicles to generate utilization metrics for those particular vehicles. The cloud model generator 140 can include one or more hardware devices configured to execute particular machine learning operations, including, but not limited to, parallel processors and transform processors manufactured to execute particular operations rapidly.

The activator component 150 can provide one or more instructions to operate the interface 210. The activator component 150 can provide instructions to the interface 170 to present one or more user interface presentations. The user interface presentations can include a presentation indicating availability of an autonomous mode of the vehicle in a particular environment. The activator component 150 can instruct the interface 170 to present one or more user interface affordances operable to receive input from a user or driver of the vehicle 190. The activator component 150 can provide one or more instructions in response to operation by one or more of the compatibility detector 110, the performance monitor 130 and the cloud model generator 140. For example, the activator component 150 can instruct the interface 170 to present a control affordance including a prompt to activate a self-parking feature in response to the compatibility detector 110 detecting an environment or scenario compatible with the self-parking feature. The activator component 150 can present one or more presentations based on one or more of the performance metrics or the utilization metrics associated with the vehicle. The presented performance metrics and utilization metrics can be associated with the particular environment or scenario proximate to the vehicle and determined by the compatibility detector 110.

The cloud data repository 160 can store one or more types and collections of data associated with the vehicle 190. The cloud data repository 160 can store information for, be used by, or otherwise can be accessible to more than one vehicle 190. The cloud data repository 160 can store and retrieve data associated with a plurality of vehicles and individualized for each of the vehicles. The cloud data repository 160 can be partially or fully co-located physically with the data processing system 102, or can be partially or fully located physically remote from with the data processing system 102. The cloud data repository 160 can include a historical data repository 162, a scenario repository 164, a model repository 166, a performance metrics repository 168, and a utilization metrics repository 169.

The historical data repository 162 can store data collected from the vehicle 190, including data corresponding to operation of the vehicle 190. The historical data repository 162 can include data individualized to the vehicle 190 and indicating, for example, states of one or more components of the vehicle 190, the vehicle computing system 104. The historical data can include, but is not limited to, geographical data, temporal data, vehicle movement data, vehicle device state, vehicle device calibration, or any combination thereof. For example, the historical data can include data describing one or more characteristics of a self-parking ADAS feature of a particular vehicle at one or more particular times.

The scenario repository 164 can store data corresponding to one or more predetermined or detected environments associated with the vehicle. For example, an environment can correspond to a particular physical space in or near which a vehicle can operate. For example, a scenario can correspond to a particular association between a physical space and a particular autonomous mode of operation of the vehicle. Thus, for example, an environment can correspond to a parking garage, and a scenario can correspond to a self-parking mode usable in the parking garage. Thus, the scenario repository can store one or more scenarios to provide correspondence between a detected environment and particular vehicle operations. The compatibility detector 110 can obtain a scenario from the scenario repository 164 as input.

The model repository 166 can store data corresponding to one or more models generated or updated by one or more of the cloud model generator 140 and the local model generator 180. The model repository 166 can store one or more models generated using machine learning, based on input from one or more of the repositories 162, 164, 166, 168 and 169 of the cloud data repository 160. The models of the model repository 166 can be associated with particular vehicles, particular scenarios, particular environments, or any combination thereof.

The performance metrics repository 168 can store data corresponding to one or more metrics associated with operation of the vehicle 190. Performance metrics can be associated with particular ADAS features, for example. For example, performance metrics can be associated with use of a self-parking feature in a particular scenario or environment. For example, a performance metric can correspond to a frequency of activation of an ADAS feature. The performance metric can correspond to a frequency of activation with respect to a particular environment or scenario, as well as with a particular vehicle. The performance metrics repository 168 can include multiple performance metrics associated with a particular vehicle, with each performance metric being associated with a particular scenario, environment, or any combination thereof. The performance metric can be based on input received from the interface 170 of the vehicle computing system 104 associated with the vehicle 190. For example, a performance metric can correspond to a frequency of deactivation of an ADAS feature. The frequency of deactivation can be based on input received from the interface 170 of the vehicle computing system 104 associated with the vehicle 190. Deactivating an ADAS feature can refer to or include terminating the performance of an ADAS feature or an ADAS function before the ADAS feature has fully completed. For example, an ADAS feature can include a pre-programmed or predetermined start state and end state, and deactivating the ADAS feature can refer to stopping, terminating or otherwise preventing the ADAS feature from reaching the pre-programmed end state.

The utilization metrics repository 169 can store data corresponding to one or more metrics associated with use of various systems of the vehicle 190. Utilization metrics can be associated with frequency of use or nonuse of ADAS features, for example. Utilization metrics can aggregate frequency of activation, frequency of deactivation, or any combination thereof, into a metric indicative of utilization of the ADAS feature. The utilization metrics can be associated with particular scenarios, environments, or any combination thereof, and the aggregation of the frequency of activation, frequency of deactivation, can be based on or restricted to particular scenarios or environments, or any combination thereof. For example, a frequency of utilization of a first resource can correspond to a frequency of activation of a claim associated with the vehicle and a particular scenario or environment. For example, a frequency of utilization of a first resource can correspond to an amount or number of activations of a claim associated with the vehicle and a particular scenario or environment, within a particular time period. Here, the claim can be associated with or filtered based on manual maneuvering of the vehicle 190 in the scenario, or on autonomous maneuvering of the vehicle 190 in the scenario using an ADAS feature. For example, the utilization of a first resource can correspond to an amount of resources used to complete the claims. The amount can be associated with cost to complete the claim. For example, utilization of a second resource can correspond to an amount of resources to operative the vehicle over time. The amount can be associated with cost to recover the claim over a particular time period or plurality of time periods.

The vehicle computing system 104 can communicate with the data processing system 102 by the network 101, and can communicate with the vehicle 190 by one or more communication protocols therebetween. The vehicle computing system 104 can include an interface 170 and a local model generator 180 operatively coupled with a vehicle 190.

The interface 170 can provide one or more communications with one or more of the data processing system 102 and the vehicle 190. The interface 170 can include a user interface presentable on a display device operatively coupled with or integrated with the vehicle 190. For example, the display can be integrated with a dashboard of the vehicle 190. The display can display at least one or more user interface presentations and control affordances, and can include an electronic display. An electronic display can include, for example, a liquid crystal display (LCD), a light-emitting diode (LED) display, an organic light-emitting diode (OLED) display, or the like. The display device can be housed at least partially within the vehicle 190.

The interface 170 can communicatively couple the vehicle computing system 104 to the data processing system 102 either directly or by the network 101. The interface 170 can communicate one or more instructions, signals, conditions, states, or the like between one or more of the vehicle computing system 104 and components, devices, blocks operatively coupled or coupleable therewith. The interface 170 can include one or more digital, analog, or like communication channels, lines, traces, or the like. For example, the interface 170 can include at least one serial or parallel communication line among multiple communication lines of a communication interface. The interface 170 can include one or more wireless communication devices, systems, protocols, interfaces, or the like. The interface 170 can include one or more logical or electronic devices including but not limited to integrated circuits, logic gates, flip flops, gate arrays, programmable gate arrays, and the like. The interface 170 can include one or more telecommunication devices including but not limited to antennas, transceivers, packetizers, and wired interface ports. Any electrical, electronic, or like devices, or components associated with the interface 170 can also be associated with, integrated with, integrable with, replaced by, supplemented by, complemented by, or the like, the vehicle computing system 104 or any component thereof.

The local model generator 180 can correspond at least partially in structure and operation to the cloud model generator 140. The local model generator 180 can be located at least partially remote from the cloud model generator 140. For example, the local model generator 180 can be located at the vehicle computing system 104 to perform one or more of machine learning model generation, training, and updating at the vehicle 190. In some cases, the data processing system 102 can include one or more component or functionality of the local model generator 180 and generate a local model that is customized or individualized for a particular vehicle 190. The data processing system 102 can store the generated local model for the vehicle 190. The vehicle 190 can download the local model from the data processing system 102. For example, a user or driver of the vehicle 190 can login, sign in, enter, or otherwise trigger or cause the vehicle 190 to query or request the local model for the vehicle 190 from the data processing system 102. Responsive to the user entering the vehicle 190 or otherwise logging into the vehicle 190, the vehicle 190 can download the local model from the data processing system 102. Thus, the local model can be a portable model that can be maintained in the data processing system 102 or other cloud server for the user of the vehicle 190. A system can generate, based on the performance of the vehicle, the frequency of activation, and a frequency of utilization of a first resource associated with the vehicle and the vehicle controller, the model. In some aspects of the system, the performance indicates a utilization of a second resource associated with the vehicle and the vehicle controller. A vehicle can generate, based on the performance of the vehicle, the frequency of activation, and a frequency of utilization of a first resource associated with the vehicle and the vehicle controller, the model. In some aspects of the vehicle, the performance indicates a utilization of a second resource associated with the vehicle and the vehicle controller. In some aspects of the vehicle, the performance indicates a utilization of a second resource associated with the vehicle and the vehicle controller.

Figure 2:
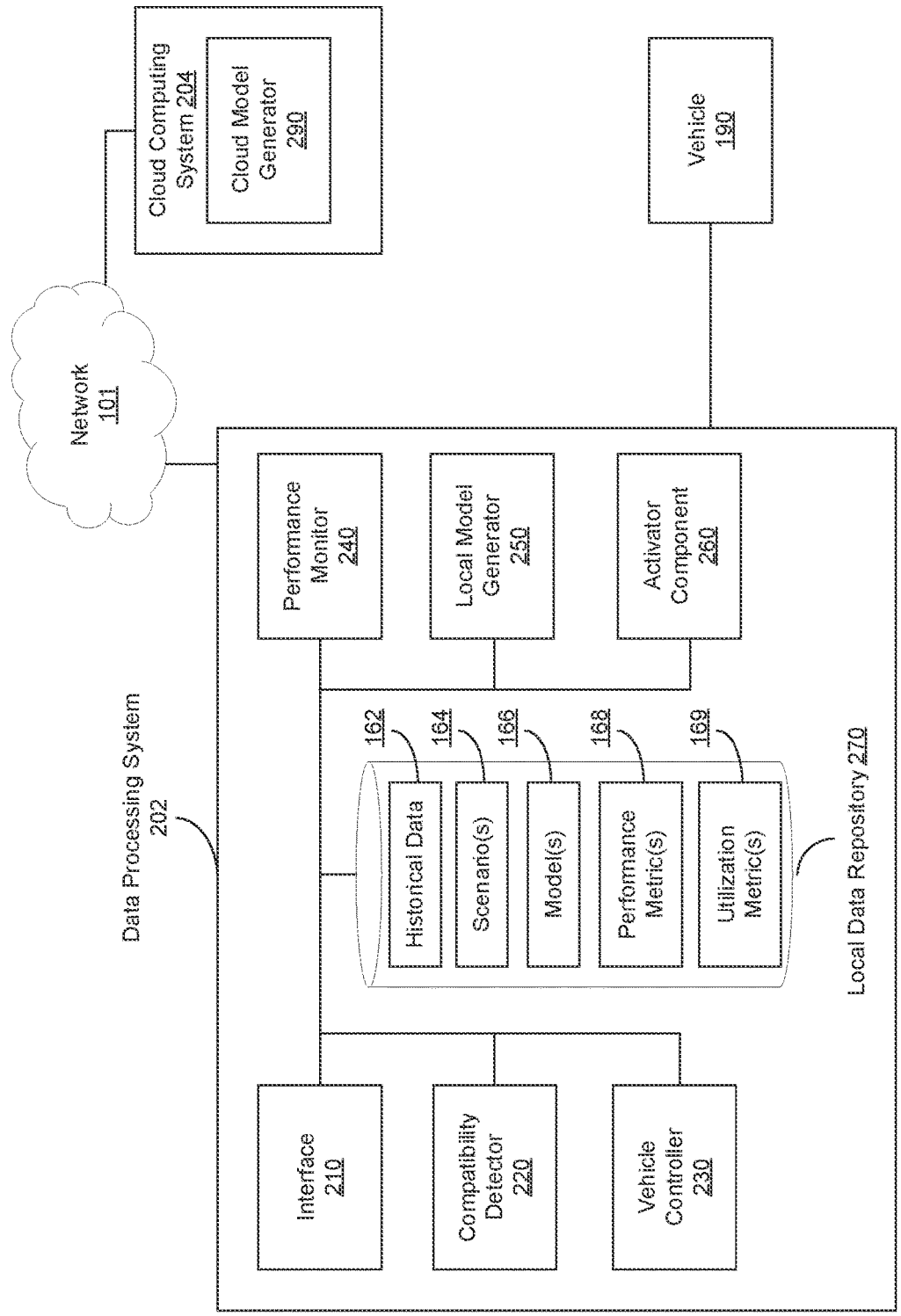
FIG. 2 depicts a block diagram of an example system to control activation of an autonomous navigation function of a vehicle.

FIG. 2 depicts a block diagram of an example system to control activation of an autonomous navigation function of a vehicle. As illustrated by way of example in FIG. 2, an example system 200 can include, interface with, access, or otherwise utilize one or more of the network 101, a data processing system 202, or a could computing system 204.

The data processing system 202 can include one or more of an interface 210, a compatibility detector 220, a vehicle controller 230, a performance monitor 240, a local model generator 250, an activator component 260, or a local data repository 270, operatively coupled with the vehicle 190. The interface 210 can correspond at least partially in structure and operation to the interface 170. The compatibility detector 220 can correspond at least partially in structure and operation to the compatibility detector 110. The vehicle controller 230 can correspond at least partially in structure and operation to the vehicle controller 120. The performance monitor 240 can correspond at least partially in structure and operation to the performance monitor 130. The cloud model generator 290 can correspond at least partially in structure and operation to the cloud model generator 140. The activator component 260 can correspond at least partially in structure and operation to the activator component 150.

The local data repository 270 can correspond at least partially in structure and operation to the cloud data repository 160. The local data repository 270 can include the historical data repository 162, the scenario repository 164, the model repository 166, the performance metrics repository 168, and the utilization metrics repository 169.

Figure 3:
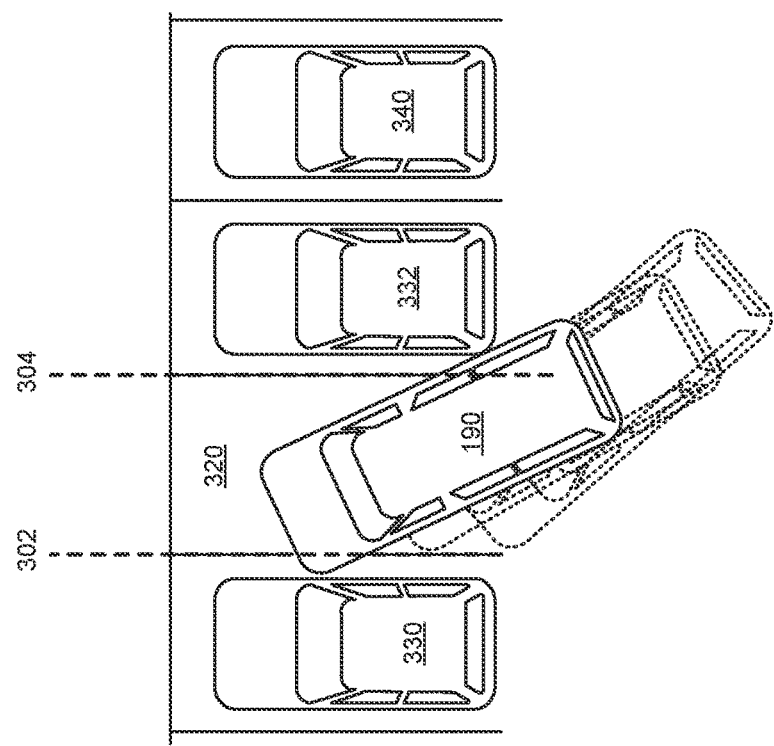
FIG. 3 depicts a first state of a scenario associated with controlling activation of an autonomous navigation function of a vehicle.

FIG. 3 depicts a first state of a scenario associated with controlling activation of an autonomous navigation function of a vehicle. As illustrated by way of example in FIG. 3, an example state 300 can include a vehicle 190, an environment 320 having one or more boundaries 302 and 304, obstacles 330 and 332 associated with the boundaries, and obstacle 340.

Figure 10:
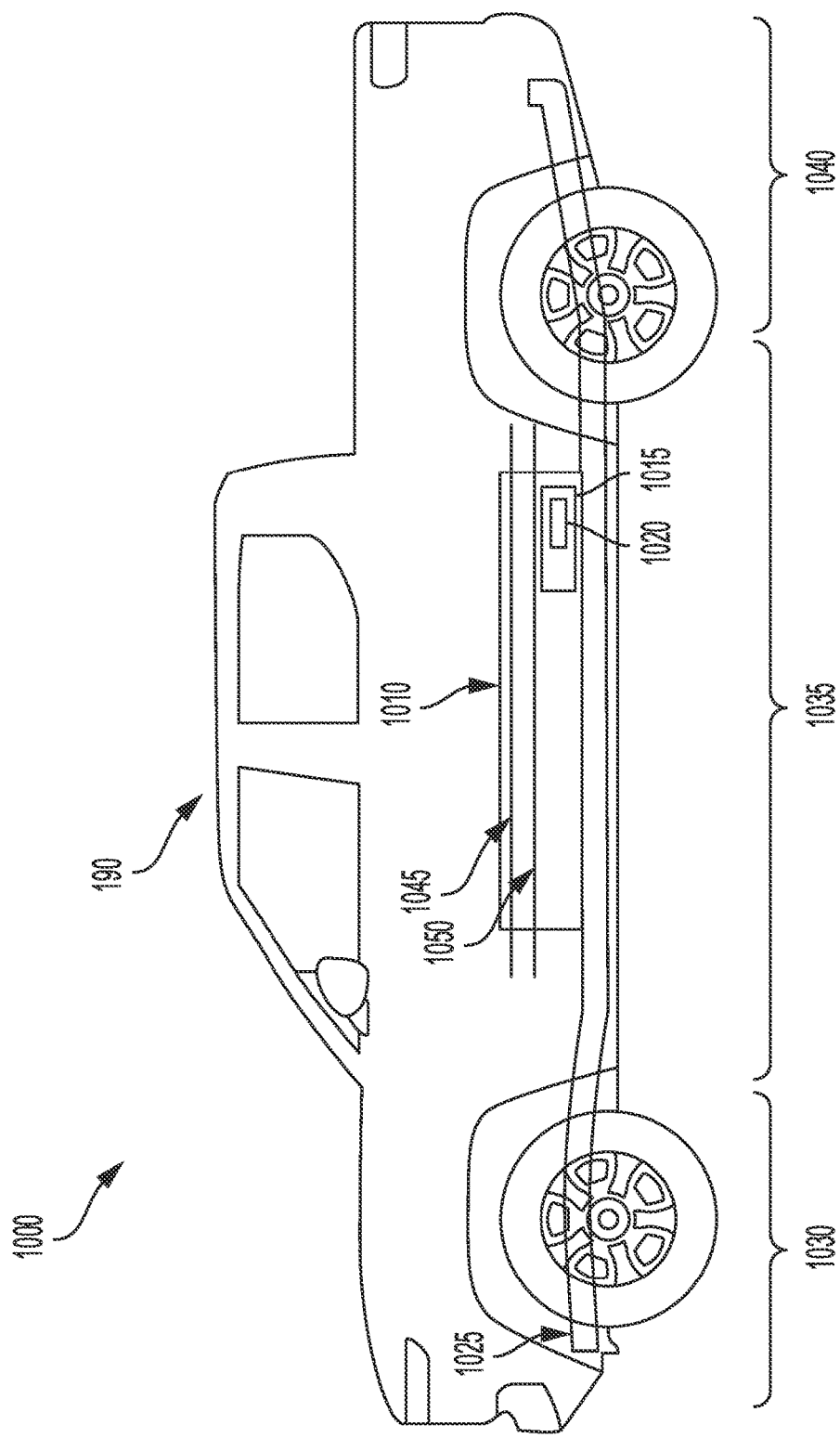
FIG. 10 depicts an example vehicle with an autonomous navigation function.

The vehicle 190 can correspond at least partially in structure and operation to the vehicle of FIG. 10 as discussed herein. The vehicle 190 can be in movement or maneuvering from a first location in an environment to a second location in an environment, in accordance with a particular scenario. For example, a first location in an environment can correspond to a driving lane or throughway of a parking lot, parking structure, or parallel parking lane. For example, a second location can correspond to a parking space accommodating the vehicle or potentially accommodating the vehicle 190 in terms of one or more of the mass, weight, height, width, length, volume, or any combination thereof, of the vehicle 190. The second location can correspond to area 320 of the environment 320, referred herein interchangeably as the environment 320. The vehicle 190 can attempt to enter the environment 320 in accordance with a scenario as discussed above. For example, the scenario can include a parking or parallel parking maneuver of the vehicle 190 from the first location to the second location. A scenario can be defined granularly, with a first scenario corresponding specifically to a perpendicular parking maneuver and a second scenario corresponding to a parallel parking maneuver.

The boundaries 302 and 304 can define thresholds or constraints associated with the environment 320. The boundaries 302 and 304 can be detected by one or more sensors of the vehicle 190. For example, the boundaries 302 and 304 can be detected visually by one or more camera sensors integrated with the vehicle 190. The boundaries 302 and 304 can at least partially align or be based on physical features or characteristics of the environment 320, any portion thereof, and portion proximate thereto, or any combination thereof. For example, the boundaries 302 and 304 can substantially align with parking space dividing lines or lane dividing lines, as illustrated by way of example.

Here, the vehicle 190 can maneuver into the environment 320 while exceeding both threshold 302 and 304, because the left side of the vehicle 190 extends beyond the boundary 302 and the right side of the vehicle 190 extends beyond the boundary 304. Exceeding boundary 302 can increase the likelihood of contact with one or more of obstacles 330. For example, exceeding boundary 302 can increase the likelihood of contact of the left side of the vehicle 190 with the obstacle 330. For example, exceeding boundary 304 can increase the likelihood of contact of the right side of the vehicle 190 with the obstacle 332. The obstacle 340 can also be present in the environment of state 300, and can be located away from the environment 320 associated with the vehicle 190 and the scenario of maneuvering the vehicle 190 into the environment. For example, the obstacles 330, 332 and 340 can correspond to vehicles having any number of wheels, road hazards including barriers, individuals including pedestrians, or any combination thereof. For example, the vehicle 190 can generate a prompt at user interface 170 or 210 to take over and self-park when a driver being a manual parking operation to maneuver the vehicle 190 into parking space 320. Thus, the vehicle can detect a maneuvering state and can request vehicle control to self-park during maneuvering. The driver can then, for example, activate autonomous navigation by the user interface 170 or 210.

Figure 4:
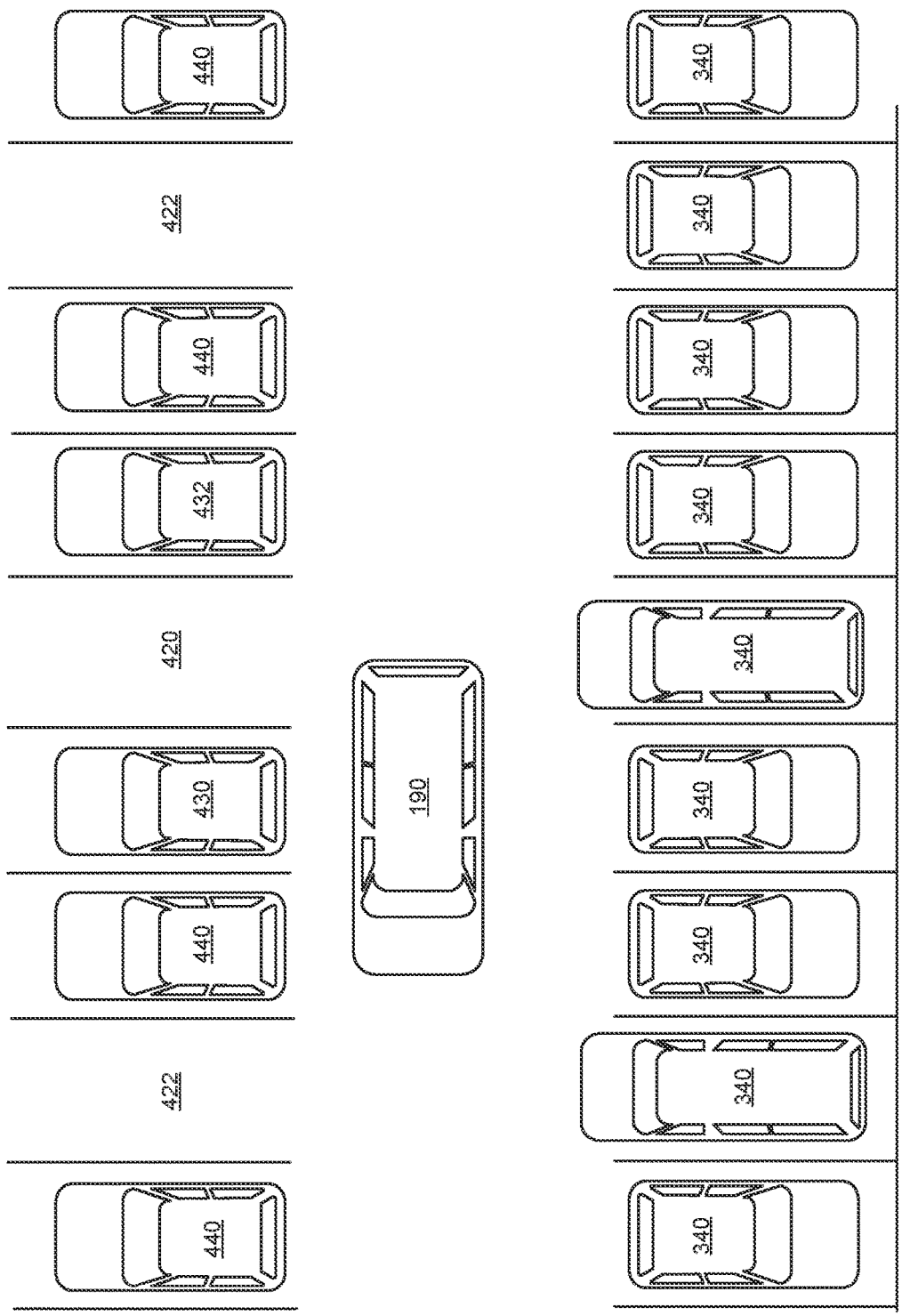
FIG. 4 depicts a second state of a scenario associated with controlling activation of an autonomous navigation function of a vehicle.

FIG. 4 depicts a second state of a scenario associated with controlling activation of an autonomous navigation function of a vehicle. As illustrated by way of example in FIG. 4, an example state 400 can include a vehicle 190, an environment including portions 420 and 422, obstacles 430 and 432 proximate to portion 420, obstacles 440 proximate to portions 422, and obstacles 340. In some aspects of a system, the scenario corresponds to an environment proximate to the vehicle and compatible with the vehicle controller. In some aspects of the system, the scenario corresponds to a parking space proximate to the vehicle, and the vehicle controller operable to maneuver the vehicle proximate to the parking space. In some aspects of a vehicle, the scenario corresponds to an environment proximate to the vehicle and compatible with the vehicle controller such that the vehicle controller is capable of navigating the vehicle through the scenario based on a confidence level. In one embodiment, the confidence level calculated based on the dimensions and available dynamics of the vehicle and an analysis of the physical objects and available space associated with the scenario (e.g., navigating into a parking space, navigating through trees along off-road and rough terrain, etc.) In some aspects of the vehicle, the scenario corresponds to a parking space proximate to the vehicle, and the vehicle controller operable to maneuver the vehicle proximate to the parking space.

In state 400, the vehicle 190 can be positioned in an environment corresponding to a parking structure or parking lot, in accordance with a scenario corresponding to a perpendicular parking maneuver. An ADAS system of the vehicle can be configured to perform the perpendicular parking maneuver in the parking structure or parking lot. The ADAS system can be further configured to identify a parking space 420 not occupied by a vehicle or obstructed by an object. In state 400, the vehicle can identify a parking space compatible with a self-parking feature of an ADAS system or vehicle controller of the vehicle 190.

The vehicle 190 can correspond at least partially in structure and operation to the vehicle of FIG. 10 as discussed herein. The environment including portions 420 and 422 can correspond at least partially in structure and operation to the environment 320. The obstacles 430 and 432 proximate to portion 420 can correspond at least partially in structure and operation to the obstacles 330 and 332. The obstacles 440 proximate to portions 422 can correspond at least partially in structure and operation to the obstacles 340. For example, the vehicle 190 can generate or receive an instruction to activate a self-parking feature in state 400.

Figure 5:
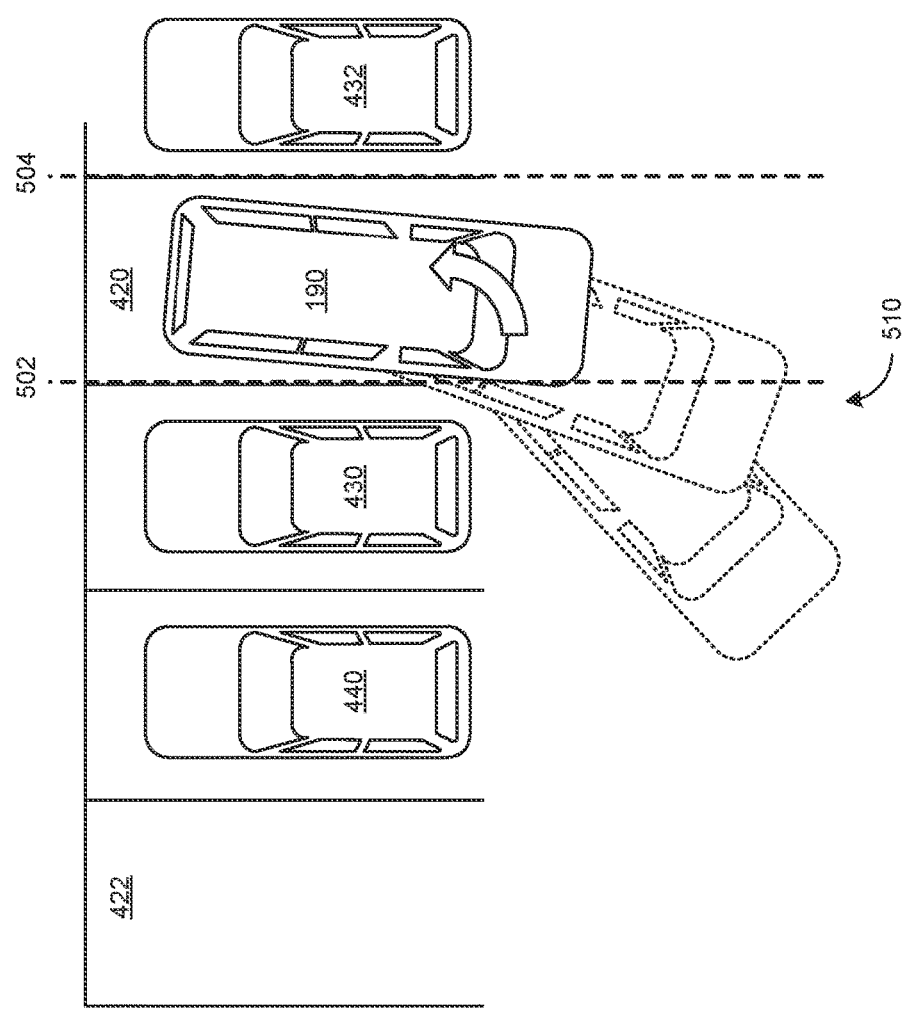
FIG. 5 depicts a third state of a scenario associated with controlling activation of an autonomous navigation function of a vehicle.

FIG. 5 depicts a third state of a scenario associated with controlling activation of an autonomous navigation function of a vehicle. As illustrated by way of example in FIG. 5, an example state 500 can include a vehicle 190, the portions 420 and 422 of the environment, one or more boundaries 502 and 504 associated with the portion 420, and the obstacles 430, 432 and 440.

In state 500, the vehicle 190 can be positioned in an environment corresponding to a parking structure or parking lot, in accordance with a scenario corresponding to a perpendicular parking maneuver. The ADAS system of the vehicle can begin performing the perpendicular parking maneuver 510 in the parking structure or parking lot, into the identified parking space 420 not occupied by a vehicle or obstructed by an object. In state 500, the vehicle can perform the maneuver compatible with the self-parking feature of an ADAS system or vehicle controller of the vehicle 190, and can perform the maneuver within the thresholds of the boundaries 502 and 504. The boundaries 502 and 504 associated with the portion 420 can correspond at least partially in structure and operation to the boundaries 302 and 304. For example, the vehicle 190 can generate or receive an instruction to deactivate a self-parking feature in state 500, in accordance with an abort operation associated with the self-park feature. For example, the vehicle 190 can generate a prompt at user interface 170 or 210 to take over and self-park when a driver being a manual parking operation to maneuver the vehicle 190 into parking space 320. Thus, the vehicle can detect a maneuvering state and can request vehicle control to self-park during maneuvering. The driver can then, for example, activate autonomous navigation by the user interface 170 or 210.

Figure 6:
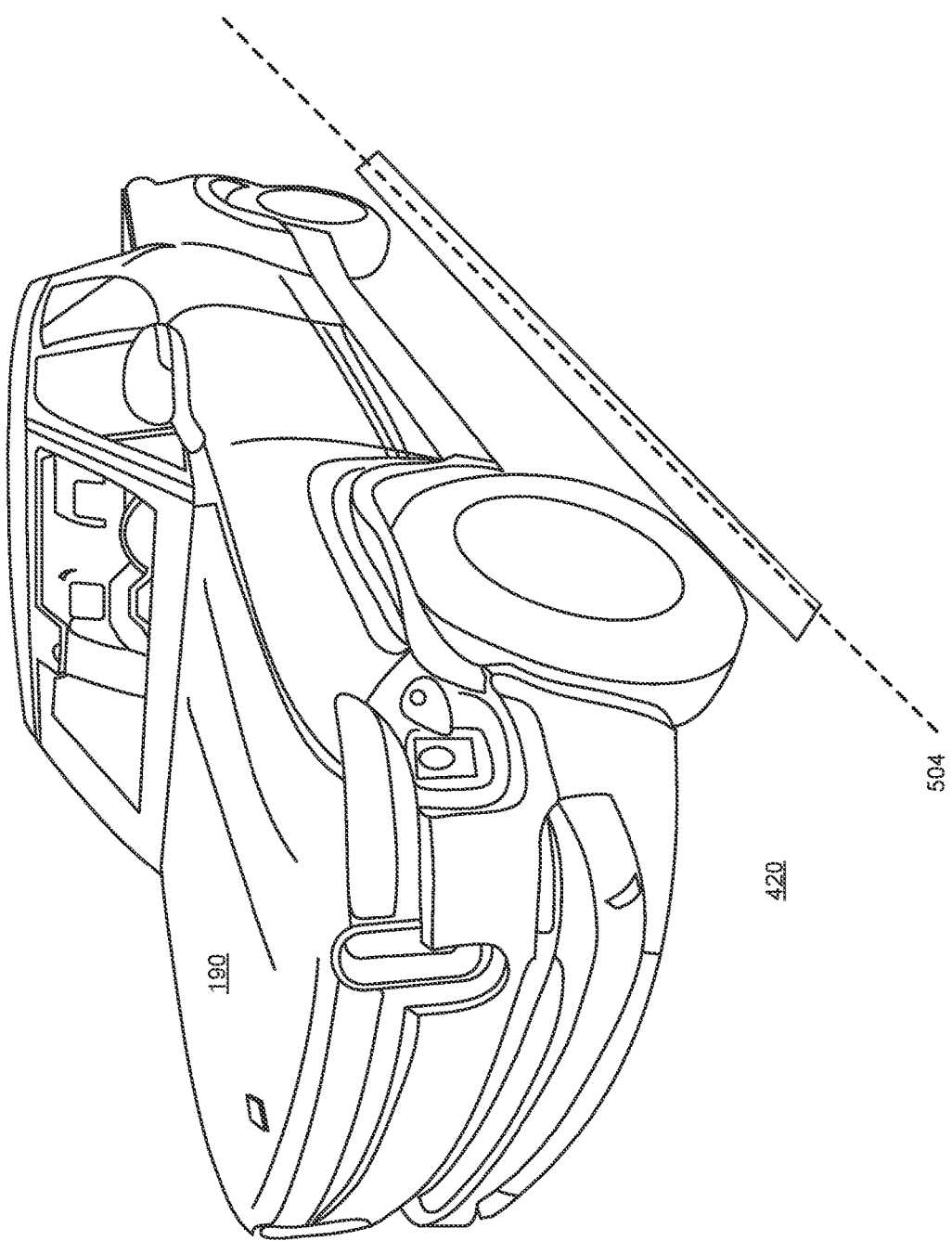
FIG. 6 depicts a fourth state of a scenario associated with controlling activation of an autonomous navigation function of a vehicle.

FIG. 6 depicts a fourth state of a scenario associated with controlling activation of an autonomous navigation function of a vehicle. As illustrated by way of example in FIG. 6, an example state 600 can include the vehicle 190, the portion 420 of the environment, and the boundary 504.

In state 600, the vehicle 190 can be positioned in an environment corresponding to a parking structure or parking lot, in accordance with a scenario corresponding to a completed perpendicular parking maneuver. The ADAS system of the vehicle can complete performing the perpendicular parking maneuver 510 in the parking structure or parking lot, into the identified parking space 420 not occupied by a vehicle or obstructed by an object. In state 600, the vehicle can complete the maneuver compatible with the self-parking feature of an ADAS system or vehicle controller of the vehicle 190, and can be positioned within the thresholds of one or more of the boundaries 502 and 504.

Figure 7:
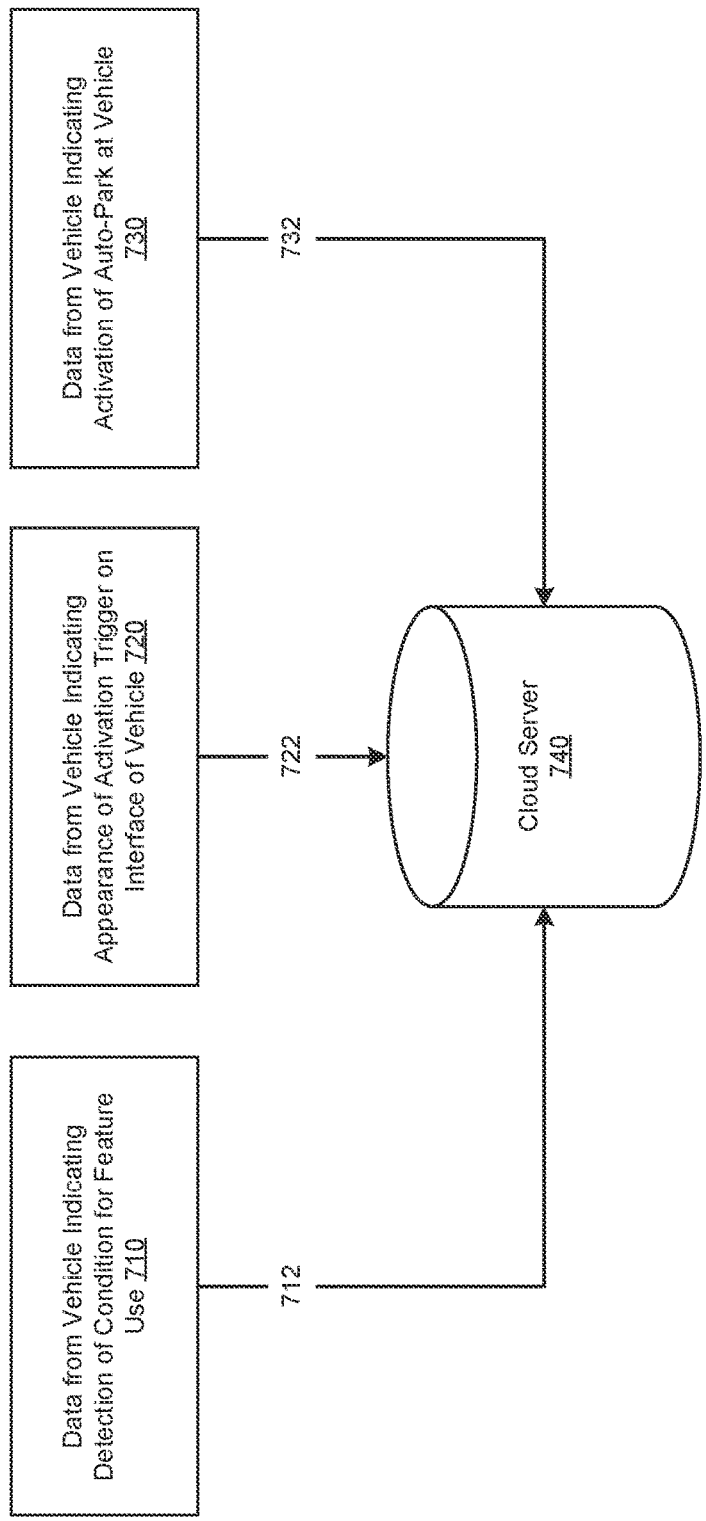
FIG. 7 depicts a block diagram of an example a data architecture to control activation of an autonomous navigation function of a vehicle.

FIG. 7 depicts a block diagram of an example a data architecture 700 to control activation of an autonomous navigation function of a vehicle. As illustrated by way of example in FIG. 7, an example architecture 700 can include a first data input 710, a second data input 720, a third data input 730, and a cloud server 740. The first, second and third data inputs 710, 720 and 730 can respectively be transmitted to the cloud server 740 by communication channels 712, 722 and 732. The communication channels 712, 722 and 732 can be distinct physical or logical lines, or can be portions of a common communication line, including, for example, a particular communication bus.

The first data input 710 can correspond to data from a vehicle indicating a detection of a condition for feature use. For example, data from a vehicle can correspond to historical data. For example, detection of a condition can be performed by the compatibility detector 110 or 220. For example, a condition for feature use can correspond to a scenario corresponding to an environment proximate to the vehicle.

The second data input 720 can correspond to data from a vehicle indicating appearance of an activation trigger on an interface of the vehicle. For example, an interface of the vehicle can correspond to a user interface in accordance with one or more of the interface 170 or 210, or the interface of FIG. 8. For example, an activation trigger can correspond to a control affordance presented on interface 170 or 210, or in accordance with the interface of FIG. 8.

The third data input 730 can correspond to data from a vehicle indicating activation of auto-park at a vehicle. For example, an indication of activation of auto-park can correspond to a selection at a user interface of a prompt by a user or driver of the vehicle. For example, the user interface can correspond to a user interface in accordance with one or more of the interface 170 or 210, or the interface of FIG. 8. The cloud server 740 can correspond at least partially in structure and operation to the cloud data repository 160 or the local data repository 270.

Figure 8:
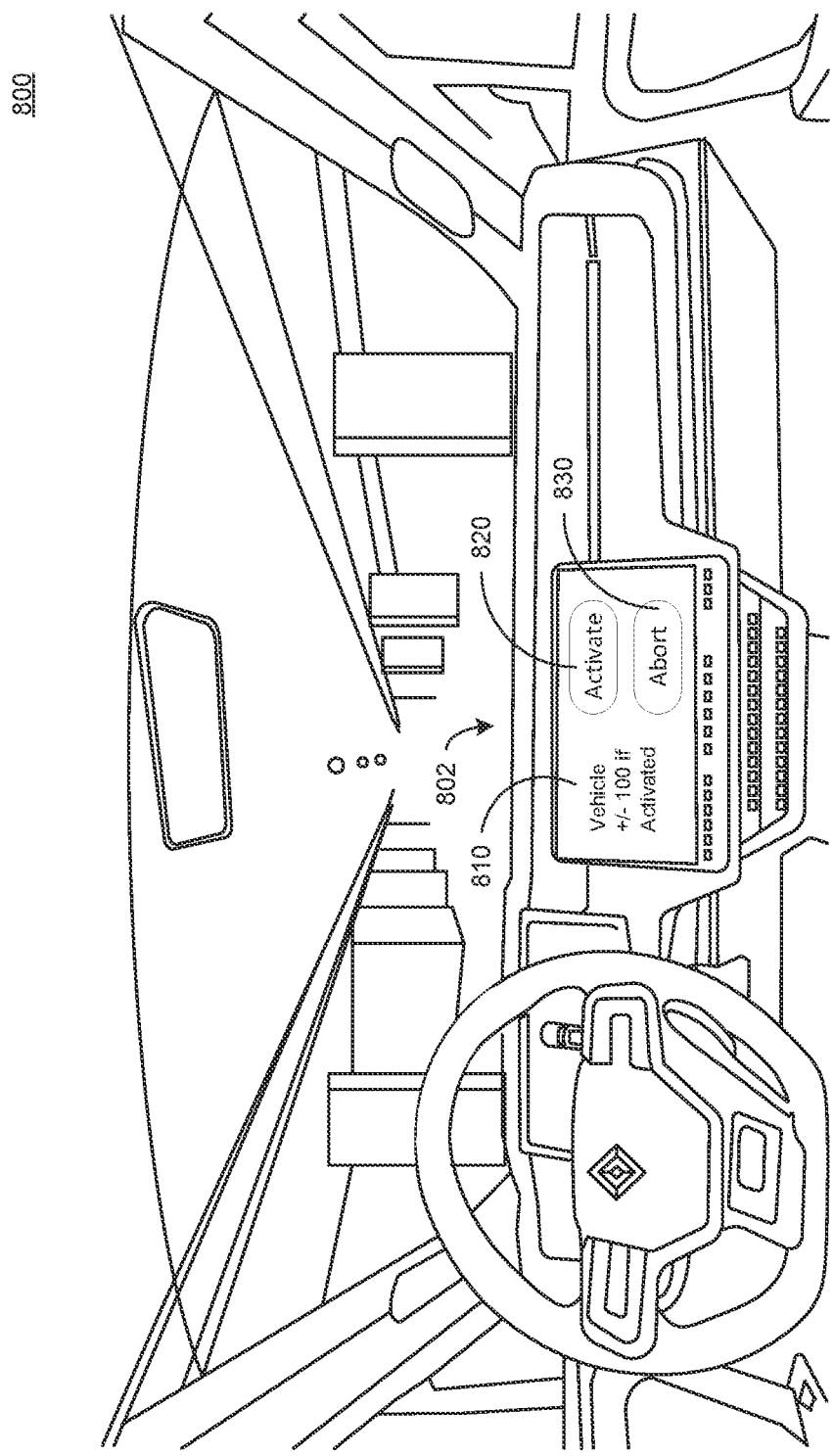
FIG. 8 depicts an example user interface of a vehicle to provide input and output corresponding to controlling activation of an autonomous navigation function of a vehicle.

FIG. 8 depicts an example user interface of a vehicle to provide input and output corresponding to controlling activation of an autonomous navigation function of a vehicle. As illustrated by way of example in FIG. 8, an example vehicle environment 800 can include a user interface 802 including a metric presentation 810 and one or more input affordances 820 and 830.

The user interface 802 can correspond at least partially in structure and operation to the interface 170 or 210. A system can receive, in response to a first selection via a user interface of the vehicle, an indication of deactivation of the vehicle controller during the subsequent instance of the scenario, and update, based on the performance of the vehicle, the frequency of activation, and the indication of deactivation, the model. The system can receive, in response to a second selection via the user interface, an indication of the activation of the vehicle controller in the subsequent instance of the scenario. A vehicle can receive, via the user interface, a first selection corresponding to an indication of deactivation of the vehicle controller during the subsequent instance of the scenario, transmit, in response to receipt of the first selection via the user interface, the indication of deactivation, and cause, in response to the transmission and based on the performance of the vehicle, the frequency of activation, and the indication of deactivation, the model to be updated. The vehicle can receive, via the user interface, a second selection responsive to the prompt, and transmit, in response to receipt of the second selection, an indication of activation of the vehicle controller in the subsequent instance of the scenario.

The metric presentation 810 can include a presentation of one or more performance metrics or utilization metrics associated with the vehicle. The metric presentation 810 can indicate a metric individualized to the particular vehicle associated with the user interface 802, and be based on historical data individualized to the particular vehicle associated with the user interface 802. For example, the metric presentation 810 can indicate a change to a particular utilization metric in response to selection of one or more of the input affordances 820 and 830. For example, the metric presentation 810 can indicate that an aggregate utilization of a resource over time can be increased or decreased in response to one or more activations of a feature associated with a particular vehicle. For example, the metric presentation 810 can indicate that an aggregate utilization of a resource over time can be increased or decreased in response to one or more activations of a self-parking feature in a scenario compatible with an environment proximate to the vehicle. For example, an operating resource, metric or cost associated with the vehicle can be reduced in accordance with a determination by a model trained with machine learning that activation of an ADAS feature results in improved performance and less resource utilization associated with operating the vehicle. Resources associated with operating the vehicle can include but are not limited to energy, charge, strain, repair, maintenance, operating cost associated therewith, or any combination thereof. For example, resources can be based on an insurance risk calculation. For example, risk reduction associated with this system can reduce the cost of insurance associated with operating the vehicle 190.

The input affordances 820 and 830 can correspond to user interface elements operable by a user or driver of the vehicle during operation of the vehicle. The activation input affordance 820 can receive from a user a selection to activate a particular feature associated with a scenario in an environment proximate to the vehicle. The abort input affordance 830 can receive from a user a selection to deactivate a particular feature associated with a scenario in an environment proximate to the vehicle. The input affordances 820 and 830 can be displayed concurrently or sequentially on the user interface 820.

Figure 9:
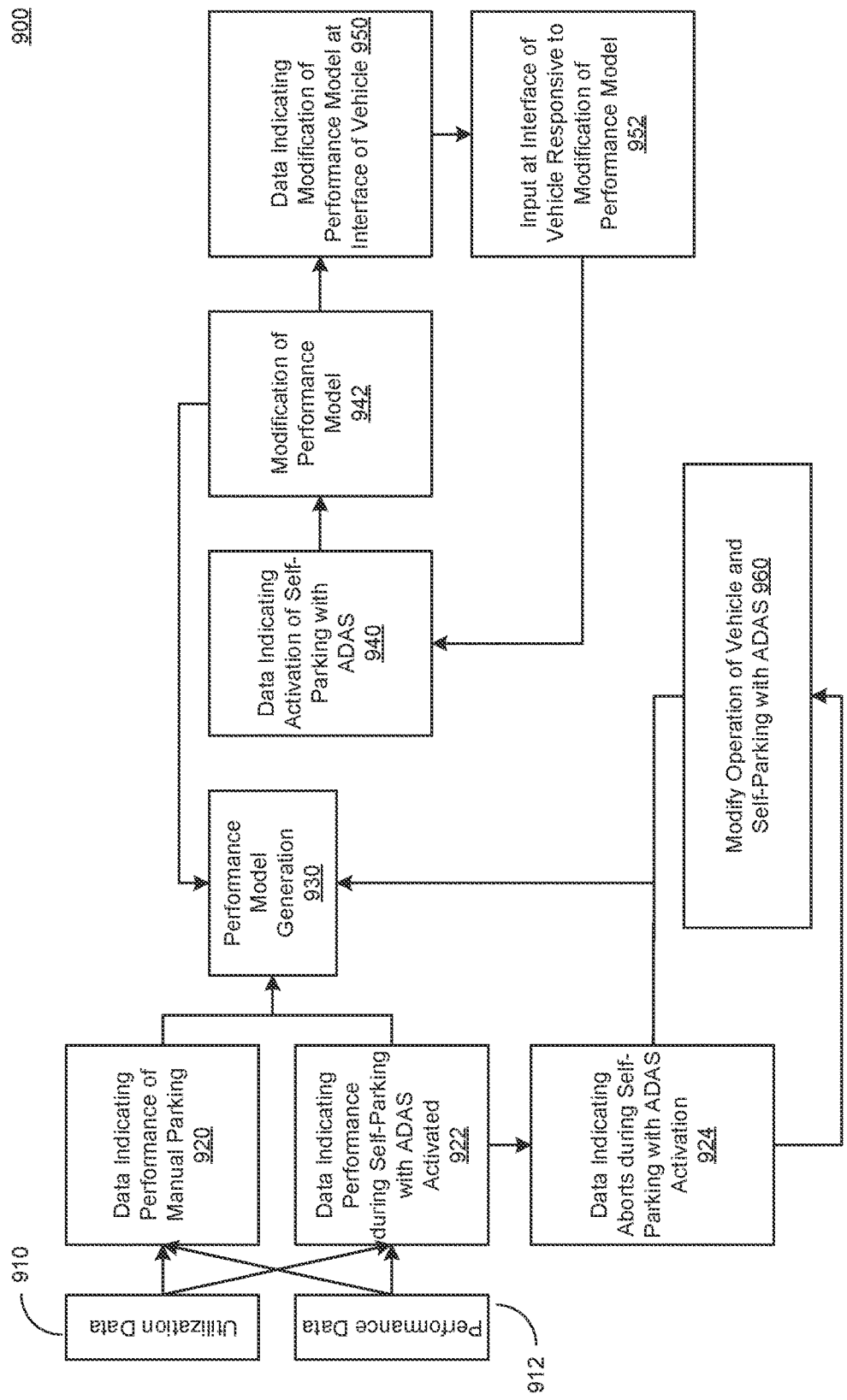
FIG. 9 depicts a block diagram of an example data architecture to control activation of an autonomous navigation function of a vehicle.

FIG. 9 depicts a block diagram of an example data architecture to control activation of an autonomous navigation function of a vehicle. As illustrated by way of example in FIG. 9, an example architecture 900 can include utilization data input 910, performance data input 912, performance data inputs 920, 922 and 924, performance model generation 930, activation input 940, performance model modification 942, interface operations 950 and 952, and modification of vehicle operation 960. The utilization data input 910 can be obtained from the utilization metrics repository 169. The performance data input 912 can be obtained from the performance metrics repository 168.

The performance data inputs 920, 922 and 924 can correspond to various historical data associated with the vehicle. The performance data inputs 920, 922 and 924 can be obtained from the historical data repository 162. The performance data input 920 can include data indicating performance of manual parking. The performance data input 922 can include data indicating performances during self-parking during activation of an ADAS feature corresponding to self-parking. The performance data input 924 can include data indicating aborts during self-parking during activation of an ADAS feature corresponding to self-parking. For example, an abort can correspond to a deactivation of an activated ADAS feature corresponding to self-parking before completion of a self-parking maneuver using the ADAS feature. For example, a performance can correspond to a claim.

The performance model generation 930 can include generating a model using machine learning by one or more of the cloud model generator 140 or 290, or the local model generator 180 or 250. The activation input 940 can include data indicating modification of a performance model at an interface of vehicle. The activation input 940 can be obtained from the interface 170 or 210, and can be obtained in accordance with the user interface 802 and control affordances 820 and 830. The performance model modification 942 can include updating a model using machine learning by one or more of the cloud model generator 140 or 290, or the local model generator 180 or 250.

The interface operations 950 and 952 be performed at least partially via the interface 170 or 210. The interface operation 950 can include data indicating modification of a performance model at the interface of the vehicle. For example, the performance model can be based on historical data and can correspond to one or more claims. The interface operation 952 can include input at the interface of the vehicle responsive to the modification of the performance model. The input can be obtained from the interface 170 or 210, and can be obtained in accordance with the user interface 802 and control affordances 820 and 830.

The modification of vehicle operation 960 can include modifying operation of the vehicle and a self-parking mode with ADAS. The modification can include modifying a utilization of a resource associated with the self-parking feature. The utilization of the self-parking feature can correspond to a cost of operating the vehicle (e.g., insurance cost) based on a particular frequency of utilization of the self-parking feature by a particular individual use or driver of a particular vehicle.

FIG. 10 depicts an example vehicle with an autonomous navigation function. FIG. 10 is directed to an example cross-sectional view 1000 of electric vehicle 190 installed with at least one battery pack 1010. Electric vehicles 190 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 1010 can also be used as an energy storage system to power a building, such as a residential home or commercial building. Electric vehicles 190 can be fully electric or partially electric (e.g., plug-in hybrid) and further, electric vehicles 190 can be fully autonomous, partially autonomous, or unmanned. Electric vehicles 190 can also be human operated or non-autonomous. Electric vehicles 190 such as electric trucks or automobiles can include on-board battery packs 1010, battery modules 1015, or battery cells 1020 to power the electric vehicles. The electric vehicle 190 can include a chassis 1025 (e.g., a frame, internal frame, or support structure). The chassis 1025 can support various components of the electric vehicle 190. The chassis 1025 can span a front portion 1030 (e.g., a hood or bonnet portion), a body portion 1035, and a rear portion 1040 (e.g., a trunk, payload, or boot portion) of the electric vehicle 190. The battery pack 1010 can be installed or placed within the electric vehicle 190. For example, the battery pack 1010 can be installed on the chassis 1025 of the electric vehicle 190 within one or more of the front portion 1030, the body portion 1035, or the rear portion 1040. The battery pack 1010 can include or connect with at least one busbar, e.g., a current collector element. For example, the first busbar 1045 and the second busbar 1050 can include electrically conductive material to connect or otherwise electrically couple the battery modules 1015 or the battery cells 1020 with other electrical components of the electric vehicle 190 to provide electrical power to various systems or components of the electric vehicle 190.

Figure 11:
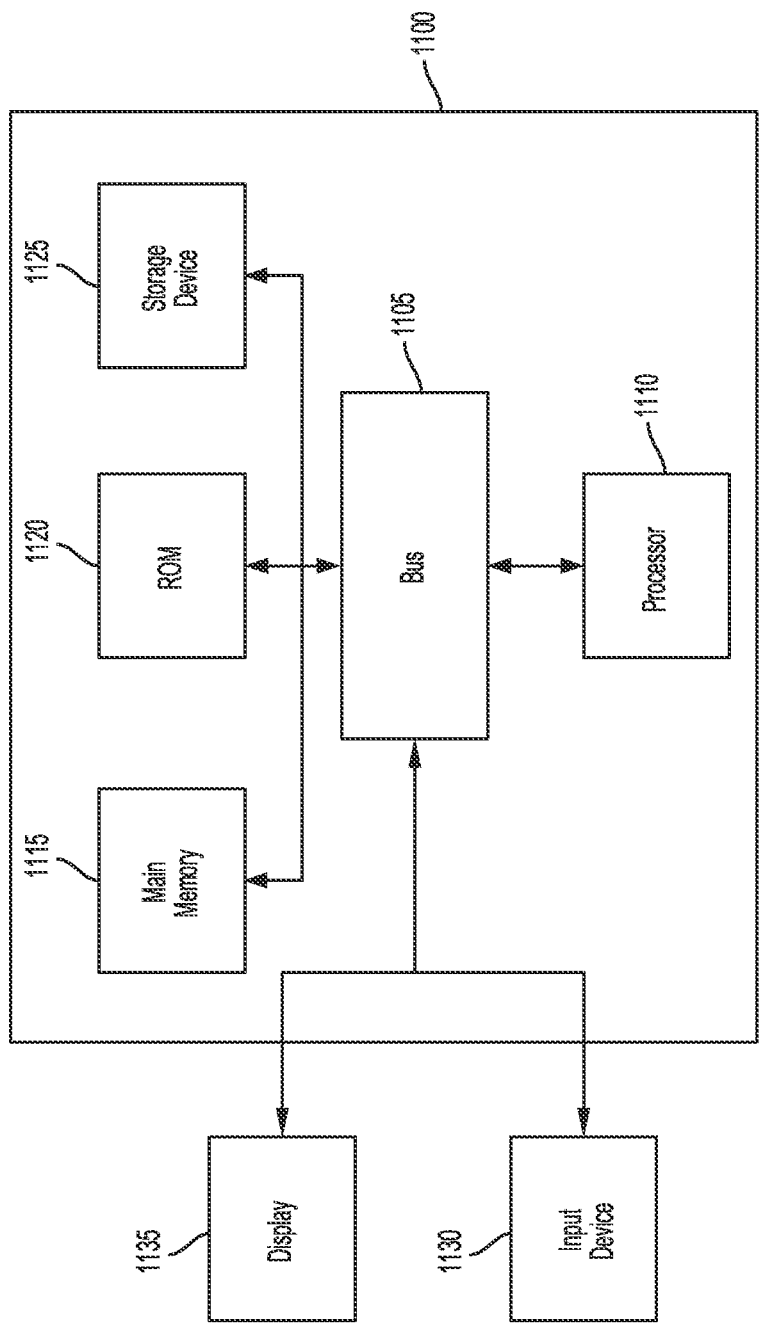
FIG. 11 depicts a block diagram of an example architecture for a computer system that can be employed to implement elements of the systems, methods, architectures, or apparatus described and illustrated herein, including, for example, the systems depicted in FIGS. 1 and 2, the data architectures depicted in FIGS. 7 and 9, the user interface depicted in FIG. 8, and the methods depicted in FIGS. 12-15.

FIG. 11 depicts a block diagram of an example architecture for a computer system that can be employed to implement elements of the systems, methods, architectures, or apparatus described and illustrated herein, including, for example, the systems depicted in FIGS. 1 and 2, the data architectures depicted in FIGS. 7 and 9, the user interface depicted in FIG. 8, and the methods depicted in FIGS. 12-15. FIG. 10 is directed to an example block diagram of an example computer system 1100. The computer system or computing device 1100 can include or be used to implement a data processing system or its components. The computing system 1100 includes at least one bus 1105 or other communication component for communicating information and at least one processor 1110 or processing circuit coupled to the bus 1105 for processing information. The computing system 1100 can also include one or more processors 1110 or processing circuits coupled to the bus for processing information. The computing system 1100 also includes at least one main memory 1115, such as a random access memory (RAM) or other dynamic storage device, coupled to the bus 1105 for storing information, and instructions to be executed by the processor 1110. The main memory 1115 can be used for storing information during execution of instructions by the processor 1110. The computing system 1100 may further include at least one read only memory (ROM) 1120 or other static storage device coupled to the bus 1105 for storing static information and instructions for the processor 1110. A storage device 1125, such as a solid state device, magnetic disk or optical disk, can be coupled to the bus 1105 to persistently store information and instructions.

The computing system 1100 may be coupled via the bus 1105 to a display 1135, such as a liquid crystal display, or active matrix display, for displaying information to a user such as a driver of the electric vehicle 190 or other end user. An input device 1130, such as a keyboard or voice interface may be coupled to the bus 1105 for communicating information and commands to the processor 1110. The input device 1130 can include a touch screen display 1135. The input device 1130 can also include a cursor control, such as a mouse, a trackball, or cursor direction keys, for communicating direction information and command selections to the processor 1110 and for controlling cursor movement on the display 1135.

The processes, systems and methods described herein can be implemented by the computing system 1100 in response to the processor 1110 executing an arrangement of instructions contained in main memory 1115. Such instructions can be read into main memory 1115 from another computer-readable medium, such as the storage device 1125. Execution of the arrangement of instructions contained in main memory 1115 causes the computing system 1100 to perform the illustrative processes described herein. One or more processors in a multi-processing arrangement may also be employed to execute the instructions contained in main memory 1115. Hard-wired circuitry can be used in place of or in combination with software instructions together with the systems and methods described herein. Systems and methods described herein are not limited to any specific combination of hardware circuitry and software.

Although an example computing system has been described in FIG. 11, the subject matter including the operations described in this specification can be implemented in other types of digital electronic circuitry, or in computer software, firmware, or hardware, including the structures disclosed in this specification and their structural equivalents, or in combinations of one or more of them.

Figure 12:
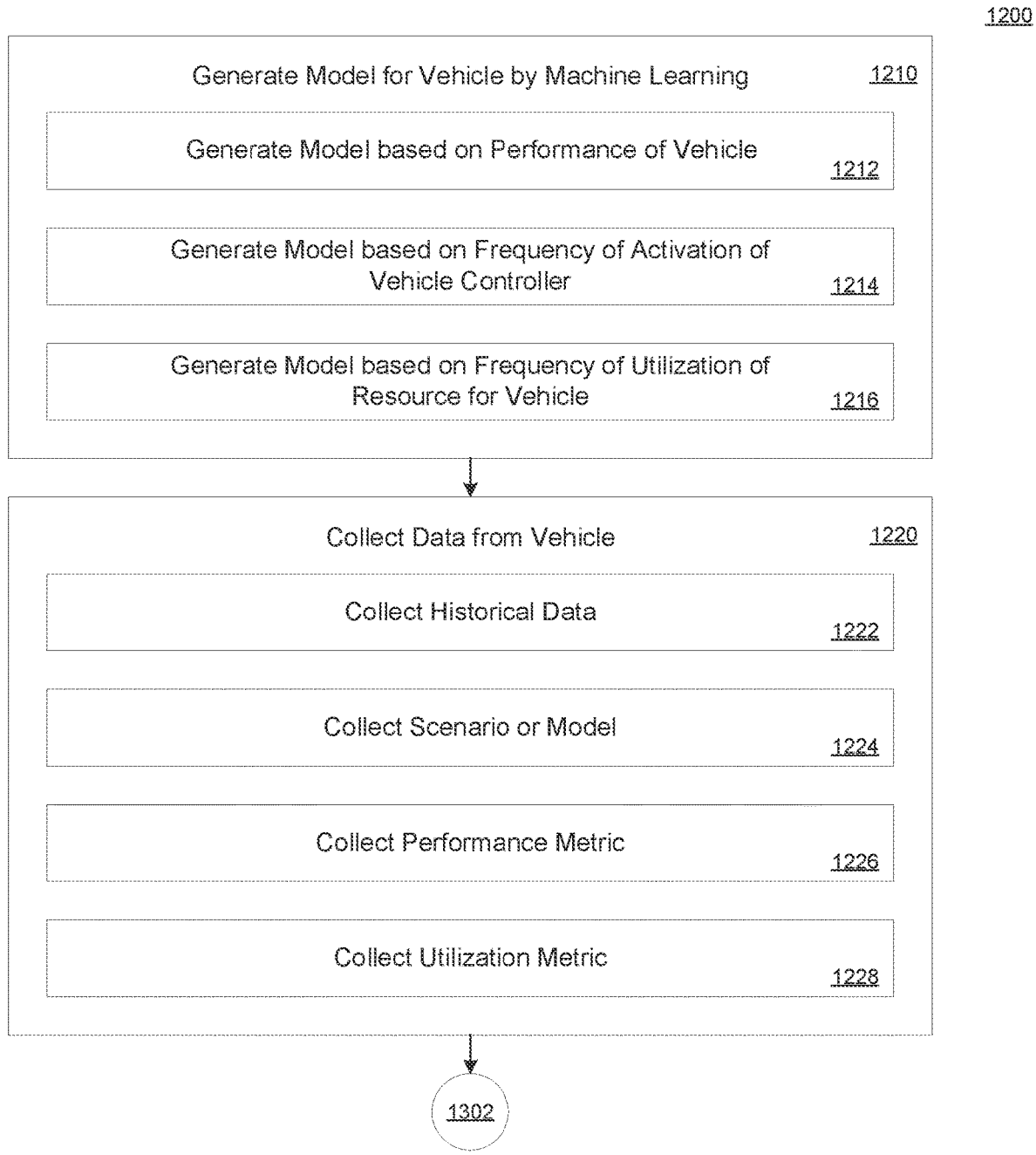
FIG. 12 depicts a flow diagram of an example method of controlling activation of an autonomous navigation function of a vehicle.

FIG. 12 depicts a flow diagram of an example method 1200 of controlling activation of an autonomous navigation function of a vehicle. At least one of the example systems 100 and 200 can perform method 1200 according to present implementations. The method 1200 can begin at act 1210.

At act 1210, the method can generate a model for a vehicle by machine learning. Act 1210 can include at least one of acts 1212, 1214 and 1216. At act 1212, the method can generate the model based on performance of the vehicle. At act 1214, the method can generate the model based on a frequency of activation of a vehicle controller of the vehicle. At act 1216, the method can generate the model based on a frequency of utilization of a resource for the vehicle. The method 1200 can then continue to act 1220.

At act 1220, the method can collect data from the vehicle. Act 1220 can include at least one of acts 1222, 1224, 1226 and 1228. At act 1222, the method can collect historical data. At act 1224, the method can collect one or more scenarios or one or more models associated with the vehicle. At act 1226, the method can collect one or more performance metrics. At act 1228, the method can collect one or more utilization metrics. The method 1200 can then continue to act 1302.

Figure 13:
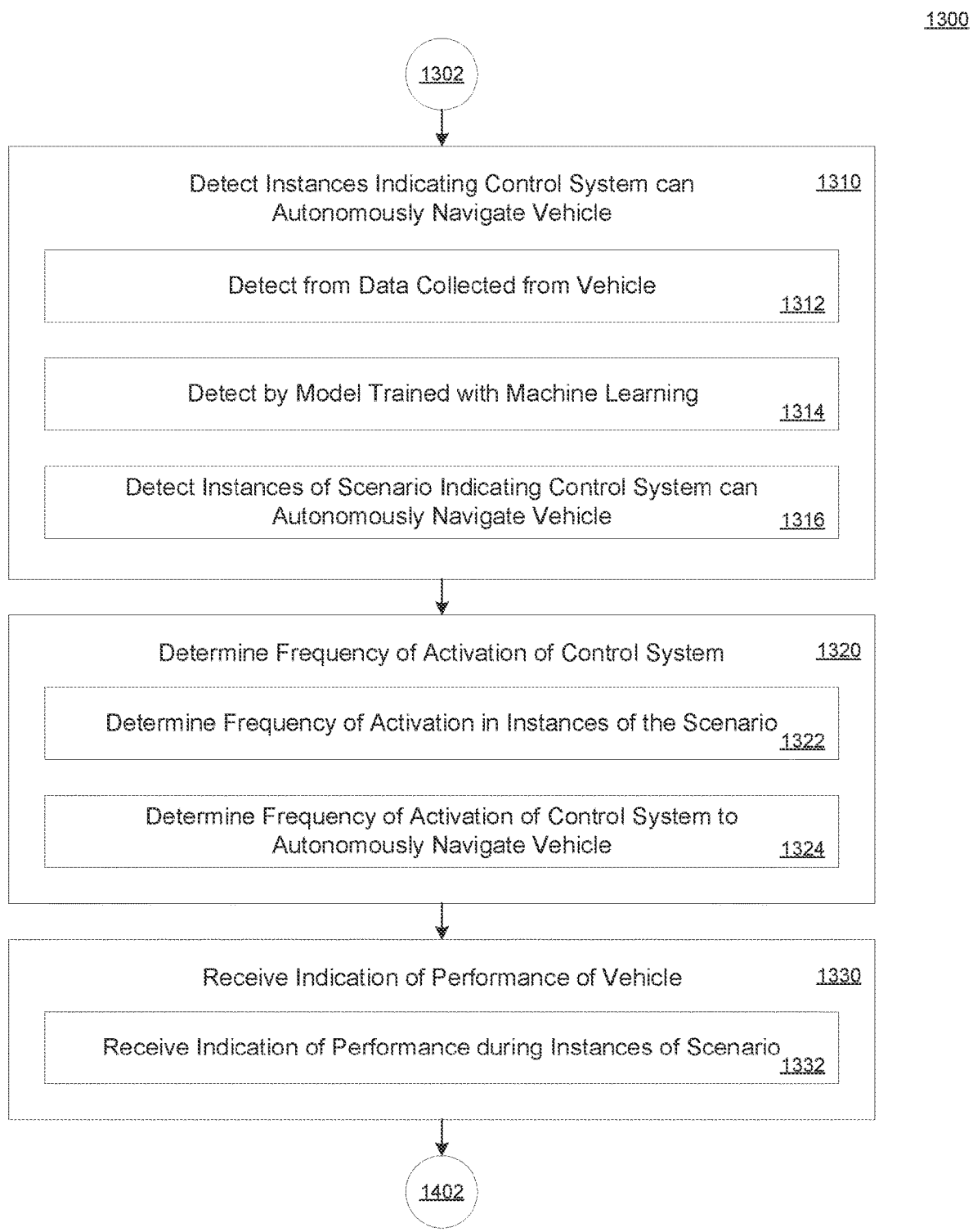
FIG. 13 depicts a flow diagram of an example method of controlling activation of an autonomous navigation function of a vehicle.

FIG. 13 depicts a flow diagram of an example method of controlling activation of an autonomous navigation function of a vehicle. At least one of the example systems 100 and 200 can perform method 1300 according to present implementations. The method 1300 can begin at act 1302. The method 1300 can then continue to act 1310.

At act 1310, the method can detect one or more instances indicating that the vehicle controller of the vehicle can autonomously navigate the vehicle. Act 1310 can include at least one of acts 1312, 1314 and 1316. At act 1312, the method can detect the instances from data collected from the vehicle. At act 1314, the method can detect the instances by a model trained with machine learning. At act 1316, the method can detect instances of a scenario indicating that the vehicle controller can autonomously navigate the vehicle. The method 1300 can then continue to act 1320.

At act 1320, the method can determine a frequency of activation of the vehicle controller. Act 1320 can include at least one of acts 1322 and 1324. At act 1322, the method can determine a frequency of activation corresponding to one or more instances of the scenario. At act 1324, the method can determine a frequency of activation of the vehicle controller to autonomously navigate the vehicle. The method 1300 can then continue to act 1330.

At act 1330, the method can receive an indication of performance of the vehicle. Act 1330 can include act 1332. At act 1332, the method can receive an indication of performance during one or more instances of the scenario. The method 1300 can then continue to act 1402.

Figure 14:
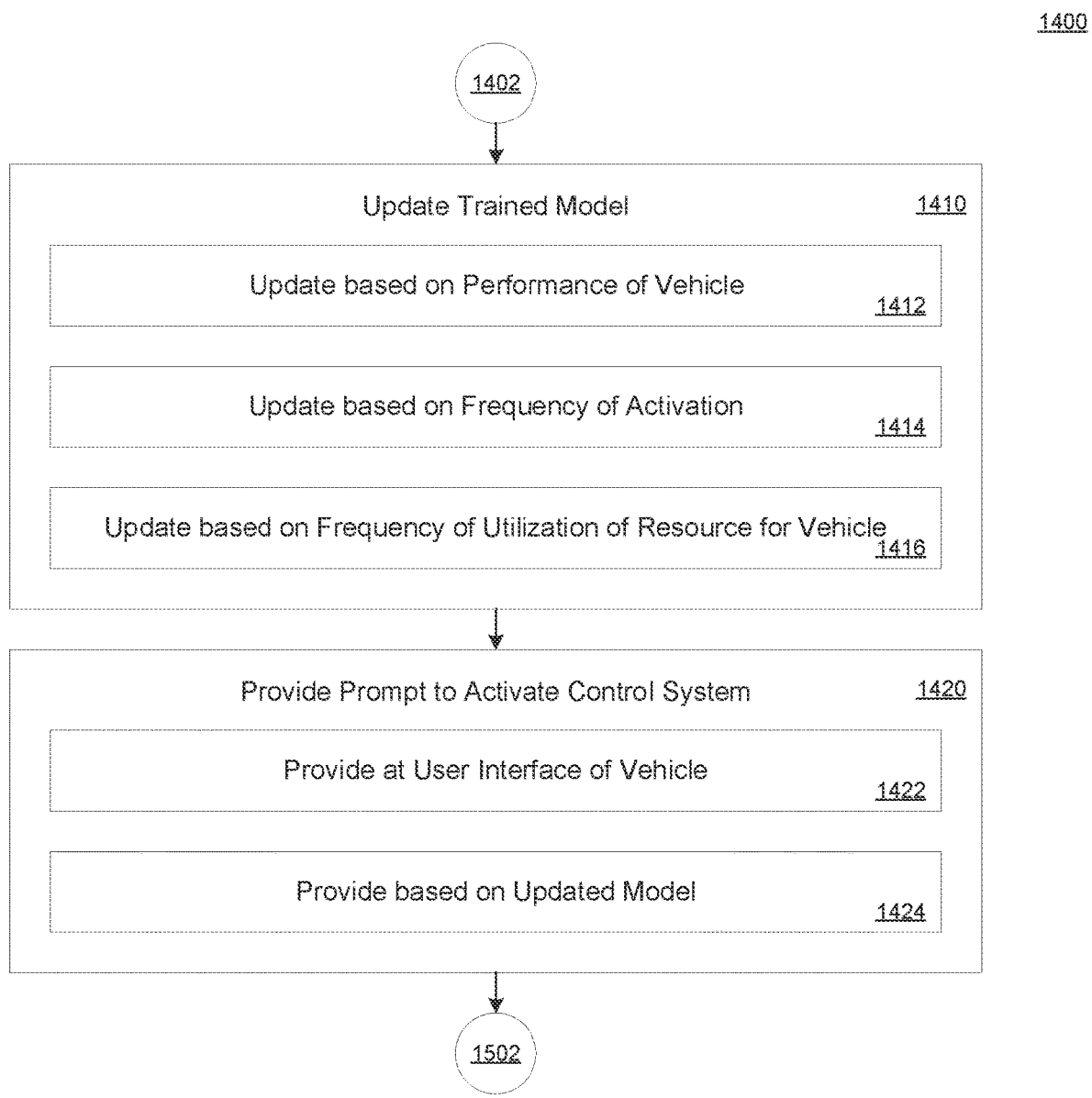
FIG. 14 depicts a flow diagram of an example method of controlling activation of an autonomous navigation function of a vehicle.

FIG. 14 depicts a flow diagram of an example method of controlling activation of an autonomous navigation function of a vehicle. At least one of the example systems 100 and 200 can perform method 1400 according to present implementations. The method 1400 can begin at act 1402. The method 1400 can then continue to act 1410.

At act 1410, the method can update a trained model. Act 1410 can include at least one of acts 1412, 1414 and 1416. At act 1412, the method can update the trained model based on a performance of a vehicle. At act 1414, the method can update the trained model based on a frequency of activation of a vehicle controller of the vehicle. At act 1416, the method can update the trained model based on a frequency of utilization of a resource for the vehicle. The method 1400 can then continue to act 1420.

At act 1420, the method can provide a prompt to activate a vehicle controller of the vehicle. Act 1420 can include at least one of acts 1422 and 1424. At act 1422, the method can provide the prompt at a user interface of the vehicle. At act 1424, the method can provide the prompt based on an updated model. The method 1400 can then continue to act 1502.

Figure 15:
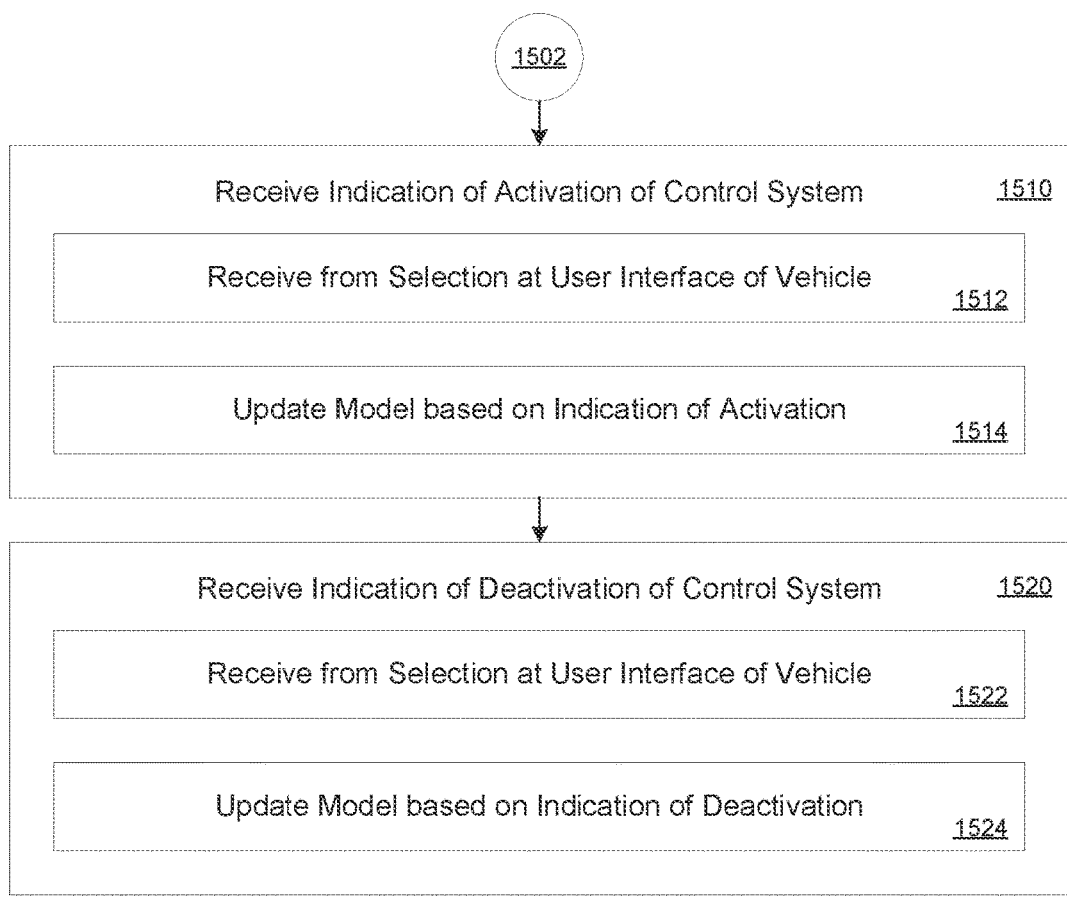
FIG. 15 depicts a flow diagram of an example method of controlling activation of an autonomous navigation function of a vehicle.

FIG. 15 depicts a flow diagram of an example method of controlling activation of an autonomous navigation function of a vehicle. At least one of the example systems 100 and 200 can perform method 1500 according to present implementations. The method 1500 can begin at act 1502. The method 1500 can then continue to act 1510.

At act 1510, the method can receive an indication of activation of the vehicle controller of the vehicle. Act 1510 can include at least one of acts 1512 and 1514. At act 1512, the method can receive the indication of activation from a selection at a user interface of the vehicle. At act 1514, the method can update the model based on the indication of activation. The method 1500 can then continue to act 1520.

At act 1520, the method can receive an indication of deactivation of the vehicle controller of the vehicle. Act 1520 can include at least one of acts 1522 and 1524. At act 1522, the method can receive the indication of deactivation from a selection at a user interface of the vehicle. At act 1524, the method can update the model based on the indication of activation. The method 1500 can end at act 1520.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system.

A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
    a data processing system comprising one or more processors, coupled to memory, to:
        determine, based on data collected from a sensor of a vehicle that identifies an environment and using a machine learning model trained on historical driving data associated with a driver of the vehicle and a driver having a driver profile corresponding to the historical driving data, that a vehicle controller of the vehicle is configured to autonomously navigate the vehicle through a predetermined maneuver in the environment identified by the sensor;
        facilitate, based on the collected data and the trained model, display of a prompt at the vehicle to activate autonomous navigation of the vehicle for the predetermined maneuver; and
        responsive to receiving an indication of activation from the driver, provide instructions to the vehicle controller to perform autonomous driving control through the predetermined maneuver.

2. The system of claim 1, comprising the data processing system to:
    determine, based on the collected data, a plurality of instances of a scenario comprising the predetermined maneuver in which the model indicates that the vehicle controller is capable of performing the autonomous driving control through the scenario;
    determine a frequency of activation of the vehicle controller to perform the autonomous driving control in the plurality of instances of the scenario; and
    update, based on a performance of the autonomous driving control and the frequency of activation, the model.

3. The system of claim 1, comprising the data processing system to:
    receive, in response to a first selection via a user interface of the vehicle, an indication of deactivation of the vehicle controller during the subsequent instance of the predetermined maneuver;
    update, based on the performance of the vehicle, the frequency of activation, and the indication of deactivation, the model; and
    receive, in response to a second selection via the user interface, an indication of the activation of the vehicle controller in the subsequent instance of the predetermined maneuver.

4. The system of claim 1, comprising:
    the environment proximate to the vehicle and corresponding to the predetermined maneuver to perform the autonomous driving control by the vehicle controller.

5. The system of claim 1, comprising:
    the scenario corresponding to a parking space proximate to the vehicle, and the vehicle controller operable to maneuver the vehicle proximate to the parking space.

6. The system of claim 1, comprising the data processing system to:
    generate, based on the performance of the vehicle, the frequency of activation, and a frequency of utilization of a first resource associated with the vehicle and the vehicle controller, the model.

7. The system of claim 6, comprising the data processing system to:
facilitate, based on the performance of the vehicle, the frequency of activation, and a frequency of utilization of an insurance resource associated with the vehicle and the vehicle controller, modification of an insurance account associated with the driver and managed by an entity that manufacturers the vehicle.

8. A vehicle, comprising:
a sensor, a user interface, a non-transitory memory, and one or more processors to:
collect, via the sensor, data associated with a driver of the vehicle and that identifies an environment;
display, via the user interface and based on the collected data and a model trained using machine learning on historical driving data associated with the driver of the vehicle and a driver having a driver profile corresponding to the historical driving data, a prompt at the user interface to activate autonomous navigation of the vehicle for a predetermined maneuver in the environment identified by the sensor;
transmit, via the user interface and in response to a determination based on the data collected from the vehicle that a vehicle controller of the vehicle is configured to autonomously navigate the vehicle through the predetermined maneuver, an indication of activation from the driver of the vehicle; and
provide, in response to the indication of activation from the driver, instructions to the vehicle controller to perform autonomous driving control through the predetermined maneuver.

9. The vehicle of claim 8, comprising the:
the model to indicate a plurality of instances of a scenario corresponding to the predetermined maneuver based on the collected data that the vehicle controller is capable of performing the autonomous driving control through the scenario; and
perform, based on a frequency of activation of the vehicle controller, the autonomous driving control in the plurality of instances of the scenario, the model to update based on a performance of the autonomous driving control and the frequency of activation.

10. The vehicle of claim 9, comprising the one or more processors to:
receive, via the user interface, a first selection corresponding to an indication of deactivation of the vehicle controller during the subsequent instance of the scenario;
transmit, in response to receipt of the first selection via the user interface, the indication of deactivation;
cause, in response to the transmission and based on the performance of the vehicle, the frequency of activation, and the indication of deactivation, the model to be updated;
receive, via the user interface, a second selection responsive to the prompt; and
transmit, in response to receipt of the second selection, an indication of activation of the vehicle controller in the subsequent instance of the scenario.

11. The vehicle of claim 8, comprising:
the environment proximate to the vehicle and corresponding to the predetermined maneuver to perform the autonomous driving control by the vehicle controller.

12. The vehicle of claim 8, comprising:
the predetermined maneuver corresponding to a parking space proximate to the vehicle, and the vehicle controller operable to maneuver the vehicle proximate to the parking space.

13. The vehicle of claim 8, comprising:
the performance indicating a utilization of a resource associated with the vehicle and the vehicle controller.

14. A system, comprising:
a data processing system comprising one or more processors, coupled to memory, to:
determine, based on data collected from a sensor of a vehicle that identifies an environment and using a machine learning model trained on historical driving data associated with a driver of the vehicle and a driver having a driver profile corresponding to the historical driving data, that a vehicle controller of the vehicle is configured to autonomously navigate the vehicle through a predetermined maneuver corresponding to the environment identified by the sensor;
facilitate, based on the collected data and the trained model, display of a prompt at the vehicle to activate autonomous navigation of the vehicle for the scenario; and
provide, responsive to receipt of an indication of activation from the driver, instructions to the vehicle controller to perform autonomous driving control through the scenario; and
facilitate, based on the performance of the vehicle, the frequency of activation, and a frequency of utilization of an insurance resource associated with the vehicle and the vehicle controller, modification of an insurance account associated with the driver.

15. The system of claim 14, comprising the data processing system to:
determine, based on the collected data, a plurality of instances of a scenario corresponding to the predetermined maneuver in which the model indicates that the vehicle controller is capable of performing the autonomous driving control through the scenario;
determine a frequency of activation of the vehicle controller to perform the autonomous driving control in the plurality of instances of the scenario; and
update, based on a performance of the autonomous driving control and the frequency of activation, the model.

16. The system of claim 15, comprising the data processing system to:
determine, based on the collected data, a plurality of instances of the scenario in which the model indicates that the vehicle controller is capable of performing the autonomous driving control through the scenario;
determine a frequency of activation of the vehicle controller to perform the autonomous driving control in the plurality of instances of the scenario; and
update, based on a performance of the autonomous driving control and the frequency of activation, the model;
receive, in response to a first selection via the user interface of the vehicle, an indication of deactivation of the vehicle controller during the subsequent instance of the scenario; and
update, based on the performance of the vehicle, the frequency of activation, and the indication of deactivation, the model; and
receive, in response to a second selection via the user interface, an indication of activation of the vehicle controller in the subsequent instance of the scenario.

17. The system of claim 14, comprising: the data processing system to reduce an insurance rate associated with the insurance account responsive to activation of the autonomous navigation.

18. The system of claim 14, wherein: the predetermined maneuver corresponds to a parking space proximate to the vehicle, and the vehicle controller is configured to maneuver the vehicle into the parking space.

19. The system of claim 15, comprising the data processing system to:
- determine, based on the collected data, a plurality of instances of a scenario corresponding to the predetermined maneuver in which the model indicates that the vehicle controller is capable of performing the autonomous driving control through the scenario;
- determine a frequency of activation of the vehicle controller to perform the autonomous driving control in the plurality of instances of the scenario; and
- update, based on a performance of the autonomous driving control and the frequency of activation, the model; and
- generate, based on the performance of the vehicle, the frequency of activation, and a frequency of utilization of a first resource associated with the vehicle and the vehicle controller, the model.

20. The system of claim 19, wherein the performance indicates a utilization of a second resource associated with the vehicle and the vehicle controller.

* * * * *